United States Patent
Inoue et al.

(10) Patent No.: US 7,508,513 B2
(45) Date of Patent: Mar. 24, 2009

(54) MEASURING APPARATUS AND MEASURING METHOD

(75) Inventors: Masaru Inoue, Nagano (JP); Akira Homma, Nagano (JP)

(73) Assignee: NHK Spring Co., Ltd., Kanagawa (JP)

( * ) Notice: Subject to any disclaimer, the term of this patent is extended or adjusted under 35 U.S.C. 154(b) by 252 days.

(21) Appl. No.: 11/400,769

(22) Filed: Apr. 10, 2006

(65) Prior Publication Data

US 2006/0244967 A1 Nov. 2, 2006

(30) Foreign Application Priority Data

Apr. 28, 2005 (JP) .............................. 2005-131486

(51) Int. Cl.
*G01B 11/00* (2006.01)

(52) U.S. Cl. ...................................... 356/399

(58) Field of Classification Search ................. 356/393; 359/368, 373
See application file for complete search history.

(56) References Cited

U.S. PATENT DOCUMENTS

| | | | | |
|---|---|---|---|---|
| 2,754,719 A | * | 7/1956 | De Chambrier | ............. 356/625 |
| 3,109,049 A | * | 10/1963 | Williams | ..................... 356/498 |
| 3,326,079 A | * | 6/1967 | Dyson et al. | ................. 356/636 |
| 3,584,960 A | * | 6/1971 | Seailles | ........................ 356/401 |
| 4,143,268 A | * | 3/1979 | Marold et al. | .......... 250/231.17 |
| 5,111,040 A | * | 5/1992 | Bernard et al. | .......... 250/237 G |

FOREIGN PATENT DOCUMENTS

GB 1271990 4/1972
JP 7-139924 6/1995
JP 11-37720 2/1999

OTHER PUBLICATIONS

First Office Action in Related Chinese Application No. 2006100766020 (with translation) mailed Sep. 21, 2007, (24 pages).
Second Office Action in Related Chinese Application No. 2006100766020 (with translation) mailed May 5, 2008, (19 pages).

* cited by examiner

*Primary Examiner*—Tarifur R. Chowdhury
*Assistant Examiner*—Isiaka O Akanbi
(74) *Attorney, Agent, or Firm*—Harrity & Harrity, LLP

(57) ABSTRACT

A measuring apparatus and a measuring method are provided, with which an accurate length measurement and position checking are achieved using a simple structure. The measuring apparatus according to the present invention is provided with a first and a second parallel prisms which capture light rays respectively reflected from a first and a second locations on one surface of an object to be measured, an optical lens which converges or diverges the light rays from the first and the second parallel prisms, an image sensor which captures the light rays from the optical lens, and converts images of the first and the second locations into an electrical signal, and a display unit which displays on one screen the images of the first and the second locations based on the electrical signal. According to the present invention, using just one optical system, measurement can be performed on one screen, as to multiple locations being spaced apart. Furthermore, an optical path can be refracted by 90 degrees with respect to the height direction just above the object to be measured, by means of the parallel prism. Therefore, size and height (work distance) of the optical system can be reduced, thereby downsizing the measuring apparatus.

28 Claims, 13 Drawing Sheets

MEASURING APPARATUS AND MEASURING METHOD

TECHNICAL FIELD

The present invention relates to a measuring apparatus and a measuring method which measure a distance between multiple points at multiple locations, a mounting angle, arrangement (alignment) of each of multiple parts, or the like, on an object to be measured. In particular, the present invention relates to a measuring apparatus and a measuring method which measure with high precision and at low cost, a distance (dimension) between points at multiple locations on an electronic component, and the mounting angle or arrangement (alignment) of each of the parts constituting the electronic component.

BACKGROUND ART

Conventionally, as a measuring apparatus which measures a distance between multiple different points and arrangement (alignment) of each part of an object to be measured, there is known a system that magnifies an image of the part to be measured with an optical lens system (microscope), outputs thus magnified image as a video signal, and displays the magnified image on a display unit.

FIG. 12 is a schematic configuration diagram of such conventional measuring apparatus as described above. Reference numeral 101 indicates the object to be measured, and it is placed on stage 102. Reference numeral 105 indicates a microscope tube, and multiple optical lenses are installed therein. Reference numeral 106 indicates an image sensor, which captures an image of a measured portion of the object to be measured 101 through the optical lenses, converts the image into electrical signals, and then transmits the signals to the display unit 107. The display unit 107 displays on display screen 108, a magnified image of the measured portion of the object to be measured 101. Scales for length measurement are superimposed on the image in the display screen 108, or the image is processed by an image processor, whereby it is possible to measure a distance from a reference point to a point to be measured in the measurement area on the object 101. In FIG. 12, for ease of explanation here, a character "A" is shown on the side surface of the object to be measured 101. However, in practice, the character "A" is described on the upper surface of the measurement area of the object to be measured 101. As is shown in FIG. 12, the character of "A" on the measurement area of the object to be measured 101 is magnified and displayed on the display screen 108.

With reference to FIG. 13A and FIG. 13B, the conventional measuring apparatus as described above will be explained, for example, in the case where it is used as a measuring apparatus to inspect the mounting status (alignment) of a suspension flexure for a hard disk or the like.

FIG. 13A shows a configuration of a suspension part of a hard disk, in which beam 3 is connected to base plate 2 via a hinge 7. Flexure 5 is mounted on the beam 3, in such a manner as coming into contact with dimple 3a provided on the beam 3. The flexure 5 is provided with pad 5a. Reference numeral 4 indicates a tentative standard hole, and numeral 6 indicates a boss hole. In inspecting the mounting position of head part of the hard disk, it is necessary to measure accurately, distance Lm (=Lc+Lv), which is a distance between the pad 5a and the center of the boss hole 6, and the mounting position of the pad 5a. FIG. 13B shows an example of TV monitor screen to perform measurement.

In the inspection of such precision component, a highly precise measurement is required. Therefore, in many cases, magnification of the image is set to be high. FIG. 13B shows a display screen when the magnification is set to be high, and the boss hole 6 extends off the screen view. In such a case above, it is impossible to directly measure the distance Lm between the pad 5a and the center of the boss hole 6. It is not possible either to directly measure the mounting position (alignment) of the pad 5a with respect to the line connecting the center of the boss hole 6 and the center of the tentative standard hole 4. As thus described, in the conventional measuring apparatus, if the rate of magnifying the image is raised in order to improve the measuring precision, the entire measuring point cannot be fitted into the screen view, and thus measuring a distance between desired two points and measuring alignment are not possible on the screen. In order to enhance the measurement precision, it is alternatively possible to employ a multi-pixel CCD, other than raising magnification, but this may render the system expensive.

Therefore, when the conventional system as described above is employed, Lv is measured using another point existing in the screen view (here, the center of tentative standard hole 4) as a tentative reference point. Lc, which is a distance between the center of the tentative standard hole and the center of the mounting hole, is preexamined according to a design value. Lv is measured assuming that this Lc is constant, and Lm is obtained from the measured value Lv (Lm=Lv+Lc).

However, since the distance between the center of the tentative standard hole 4 and the boss hole 6 may vary depending on degree of processing accuracy and assembling accuracy, it is not constant to be exact. Consequently, a result of measurement with high precision cannot be obtained.

As an example of a measuring method to solve the above problems, JAPANESE PATENT APPLICATION LAID OPEN (KOKAI) H07-139924 discloses a method for measuring two points simultaneously on an electronic component. In this particular example, two image sensors respectively capture images of two points. Therefore, requirements of two image sensors may cause a cost increase for the apparatus.

JAPANESE PATENT APPLICATION LAID OPEN (KOKAI) H11-37720 discloses a measuring method in which images of respective points are obtained by independent two optical systems. Therefore, even if the magnification of the optical system is set higher, the images will not extend off the view of the optical system. However, this method requires two lens systems and two image sensor systems, thereby rendering the configuration of the apparatus complicated, also causing cost increase for the apparatus.

In addition, if the conventional apparatus is used, it is not possible to accurately measure the mounting position (alignment) of the pad 5a, with respect to the line connecting the center of the boss hole 6 and the tentative standard hole 4.

The present invention has been made considering the above problems, and its purpose is to provide an apparatus and a measuring method which achieve a measurement of distances (dimensions) between multiple points at multiple locations on the object to be measured, and mounting angle and arrangement (alignment) of each part on the object to be measured, by use of one optical system and one screen. In addition, another purpose of the present invention is to provide a measuring apparatus and a measuring method with which it is possible to handle the case where multiple points at multiple locations on the object to be measured are respectively provided on both front surface and back surface.

SUMMARY OF THE INVENTION

A measuring apparatus according to the present invention is provided with, a first parallel prism and a second parallel prism which capture light rays respectively reflected from a first location and a second location on one surface of an object to be measured, an optical lens which converges or diverges the light rays from the first parallel prism and the second parallel prism, an image sensor which captures the light rays from the optical lens, and converts images of the first location and the second location into an electrical signal, and a display unit which displays on one screen the images of the first location and the second location based on the electrical signal.

The measuring apparatus according to the present invention is provided with, a first parallel prism and second parallel prism which capture light rays respectively reflected from a first location on a first object to be measured and a second location on a second object to be measured, an optical lens which converges or diverges the light rays from the first parallel prism and the second parallel prism, an image sensor which captures the light rays from the optical lens, and converts images of the first location and the second location into an electrical signal, and a display unit which displays on one screen the images of the first location and the second location based on the electrical signal.

The first parallel prism and the second parallel prism emit in the same direction, the light rays respectively reflected from the first location and the second location.

The measuring apparatus according to the present invention is provided with, a first trapezoidal prism and a second trapezoidal prism which capture light rays respectively reflected from a first location and a second location on different surfaces of the object to be measured, a first reflecting prism and a second reflecting prism which capture the light rays respectively from the first trapezoidal prism and the second trapezoidal prism, and respectively emit the light rays in the same direction, an optical lens which converges or diverges the light rays from the first reflecting prism and the second reflecting prism, an image sensor which captures the light rays from the optical lens, and converts images of the first location and the second location into an electrical signal, and a display unit which displays on one screen the images of the first location and the second location based on the electrical signal.

The first trapezoidal prism and the second trapezoidal prism emit the light rays reflected from the first location and the second location on the object to be measured, respectively in directions different by 180 degrees.

The first reflecting prism and the second reflecting prism may be rectangular prisms.

The measuring apparatus according to the present invention which converges or diverges light rays reflected from a first location and a second location on one surface of the object to be measured, by use of an optical lens, displays images of the first location and the second location of the object to be measured on one screen via an image sensor, and measures on the one screen, a distance between multiple points positioned on the first location and the second location, or an angle or arrangement of parts of the object to be measured, the parts being positioned on the first location and the second location, wherein, incident side reflecting surface sections of two parallel prisms which receive the light rays reflected from the first location and the second location of the object to be measured are installed respectively just above the first location and the second location, and the optical lens is placed at a position where emitting side reflecting surface sections of the two parallel prisms are arranged to be adjacent to each other on the opposite side of the object to be measured.

The measuring apparatus according to the present invention which converges or diverges light rays reflected from a first location on a first surface of the object to be measured and a second location on a second surface different from the first surface of the object to be measured, by use of an optical lens, displays images of the first location and the second location of the object to be measured on one screen via an image sensor, and measures on that one screen, a distance between multiple points positioned on the first location and the second location, angle and arrangement of parts on the object to be measured, the parts being positioned on the first location and the second location, wherein, in order to make the light rays reflected from the first location and the second location at incident side and the light rays at the emitting side respectively to go along opposite directions, incident side reflecting surface sections of two trapezoidal prisms are placed respectively just above the first location and the second location, multiple reflecting prisms are placed respectively at the emitting side reflecting surface sections of the two trapezoidal prisms, and the optical lens is placed at a position where the emitting side reflecting surface sections of the multiple reflecting prisms are arranged to be adjacent to each other.

The multiple reflecting prisms may be rectangular prisms.

Alternatively, one of the multiple reflecting prisms may be a rectangular prism and the other thereof is a trapezoidal prism.

A measuring method according to the present invention features that it captures light rays reflected from a first location and a second location on one surface of an object to be measured respectively into a first parallel prism and a second parallel prism, converges or diverges the light rays from the first parallel prism and the second parallel prism, captures the light rays thus converged or diverged, converts images of the first location and the second location on the object to be measured into an electrical signal, and displays on one screen the images of the first location and the second location based on the electrical signal.

The measuring method according to the present invention features that it captures light rays reflected from a first location on a first object to be measured and a second location on a second object to be measured, respectively into a first parallel prism and a second parallel prism, converges or diverges the light rays from the first parallel prism and the second parallel prism, captures the light rays thus converged or diverged, converts images of the first location and the second location on the object to be measured into an electrical signal, and displays on one screen the images of the first location and the second location based on the electrical signal.

The first parallel prism and the second parallel prism emit in the same direction, the light rays respectively reflected from the first location and the second location on the object to be measured.

The measuring method according to the present invention features that it captures light rays reflected from a first location and a second location on different surfaces of an object to be measured respectively into a first trapezoidal prism and a second trapezoidal prism, captures the light rays from the first trapezoidal prism and the second trapezoidal prism respectively into the first reflecting prism and the second reflecting prism, emits each of the light rays in the same direction, converges or diverges the light rays from the first reflecting prism and the second reflecting prism, captures the light rays thus converged and diverged, converts images of the first location and the second location on the object to be measured into an electrical signal, and displays on one screen the images of the first location and the second location based on the electrical signal.

The first trapezoidal prism and the second trapezoidal prism emit the light rays reflected from the first location and the second location on the object to be measured, respectively in directions different by 180 degrees.

The first reflecting prism and the second reflecting prism may be rectangular prisms.

According to the present invention relating to the measuring apparatus and the measuring method, it is possible to measure a distance between multiple points on multiple spaced-apart locations. According to the present invention relating to the measuring apparatus and the measuring method, it is further possible to accurately measure the inclination of a particular portion of the object to be measured, and thus an accurate mounting angle of the particular portion can be obtained.

According to the present invention relating to the measuring apparatus and the measuring method, it is possible to display multiple locations on the front and back surfaces of the object to be measured are displayed side by side on one screen, and with just one optical system, it is possible to perform measurement of multiple locations being spaced apart on the front and back surfaces.

According to the present invention relating to the measuring apparatus and the measuring method, by use of the parallel prism, it is possible to refract an optical path just above the object to be measured by 90 degrees with respect to the height direction, thereby reducing the size and height (work distance) of the optical system and enhancing freedom degree of layout in the apparatus. Consequently, the apparatus is downsized.

DETAILED DESCRIPTION

Preferred embodiments of the present invention will be explained with reference to the accompanying drawings. In the present embodiments, a measuring apparatus and a measuring method of the present invention will be explained, as a way of example, in the case where those are used for inspecting a mounting position and angle of a flexure pad on a hard disk suspension. However, the present invention is not limited to this example.

Figure 1:
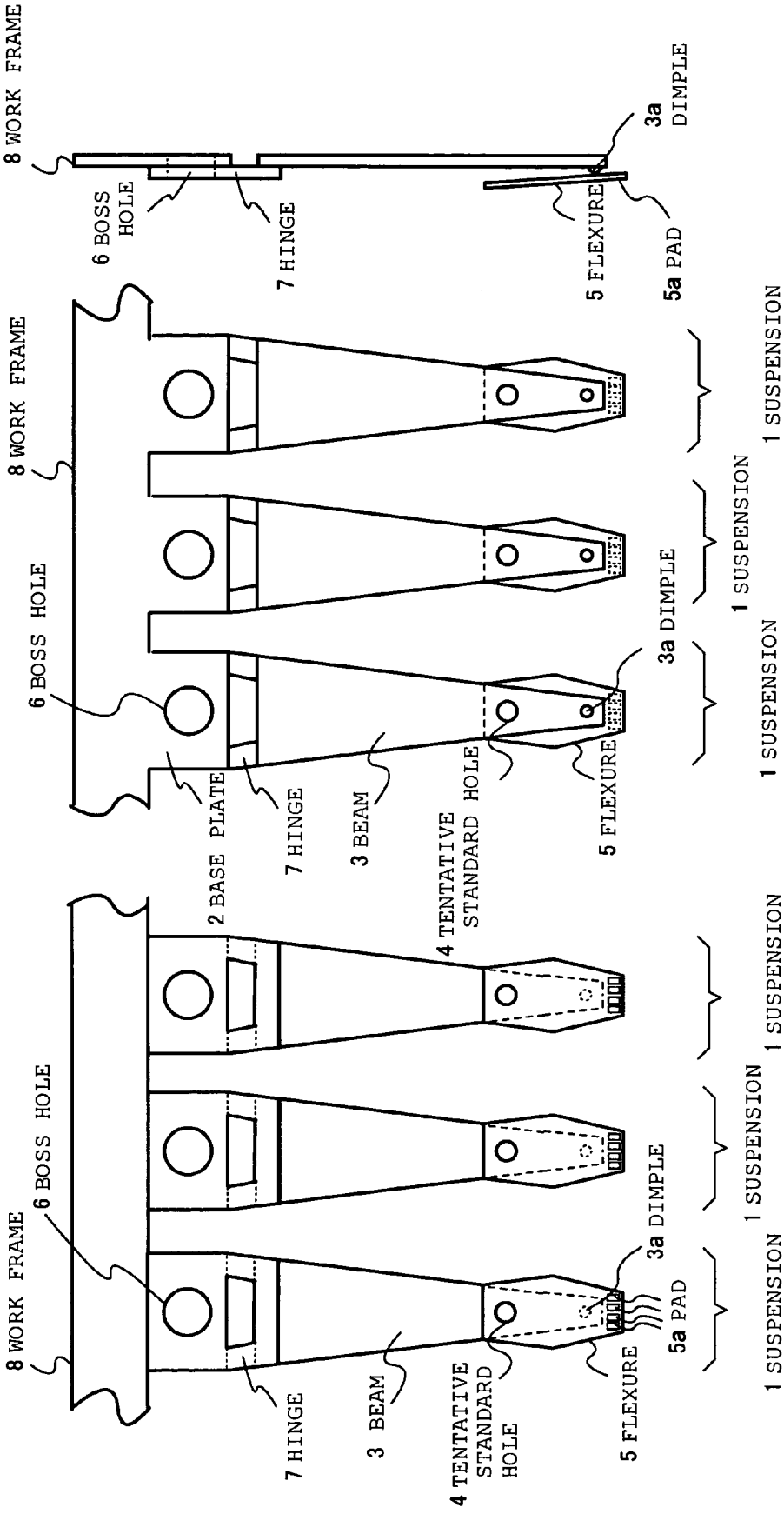
FIG. 1A, FIG. 1B, and FIG. 1C are illustrations each showing a hard disk use suspension that is used in a measuring apparatus according to the first embodiment of the present invention.

Firstly, FIG. 1A, FIG. 1B, and FIG. 1C are referred to. FIG. 1A, 1B, and 1C are, respectively, a top view, a bottom view, and a side view of the hard disk use suspension, in the intermediate manufacturing process. Reference numeral 8 indicates a work frame, numeral 2 indicates a base plate, numeral 3 indicates a beam, numeral 5 indicates a flexure, and numeral 7 indicates a hinge. On the beam 3, there is formed a dimple 3a on the distal end, so that a magnetic head is allowed to operate in a gimbal mechanism. The flexure 5 has a tongue surface on which a magnetic head (not illustrated) is mounted, and pad 5a as signal wiring is formed thereon. The hinge 7 is a spring portion on which loads are generated. Boss hole 6 is formed on the base plate 2, and it is a dimensional reference for the suspension 1. As shown in FIG. 1A to FIG. 1C, the beam 3 is connected to the base plate 2 via the hinge 7. The flexure 5 is mounted on the beam 3 in such a manner as coming into contact with the dimple 3a that is provided on the beam 3. It is understood that the suspensions 1 are connected to the work frame 8 in a form of band, before each suspension is cut off one by one. Dimple 3a is provided on the beam 3, and the flexure 5 is mounted on the beam 3 in such a manner as coming into contact with the dimple 3a. It is to be noted here tentative standard hole 4 is provided on both the beam 3 and the flexure 5, and the flexure 5 is mounted on the beam 3 so that the tentative standard hole 4 of the beam 3 and the tentative standard hole 4 of the flexure 5 agrees with each other.

Figure 2:
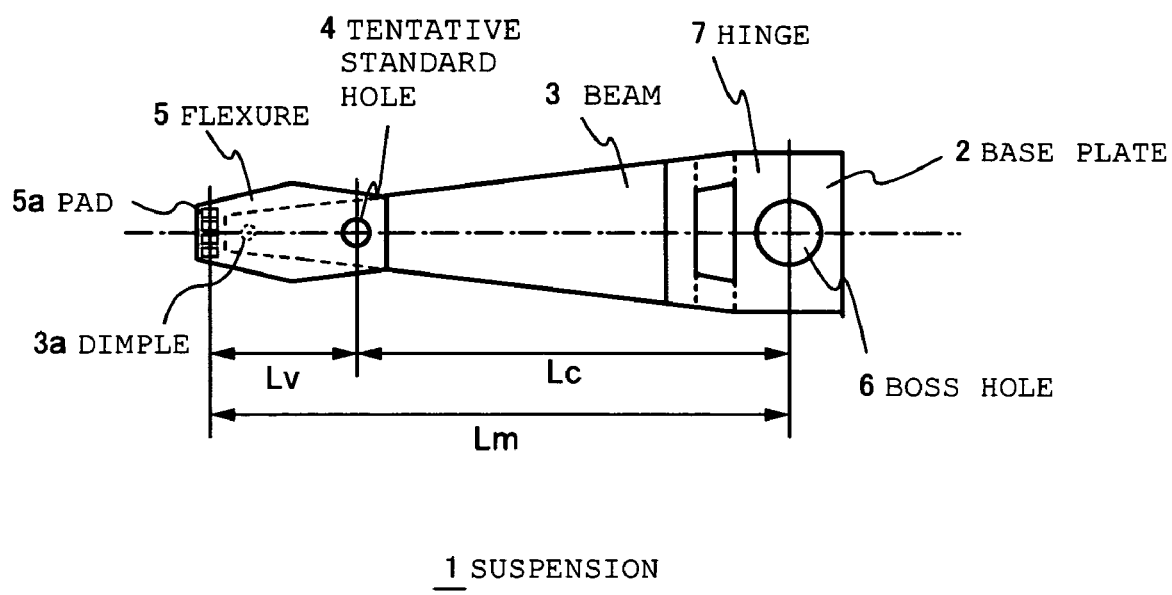
FIG. 2 is an illustration showing the hard disk use suspension that is used in the measuring apparatus according to the first embodiment of the present invention.

FIG. 2 is an illustration showing a suspension 1, which has been cut off the work frame and separated therefrom. In inspecting the mounting position of the head part of the hard disk, it is necessary to measure accurately the distance Lm (=Lc+Lv) between the pad 5a and the center of the boss hole 6, and the mounting position of the pad 5a. The boss hole 6 is a hole to install the suspension 1 on the hard disk.

Figure 3A:
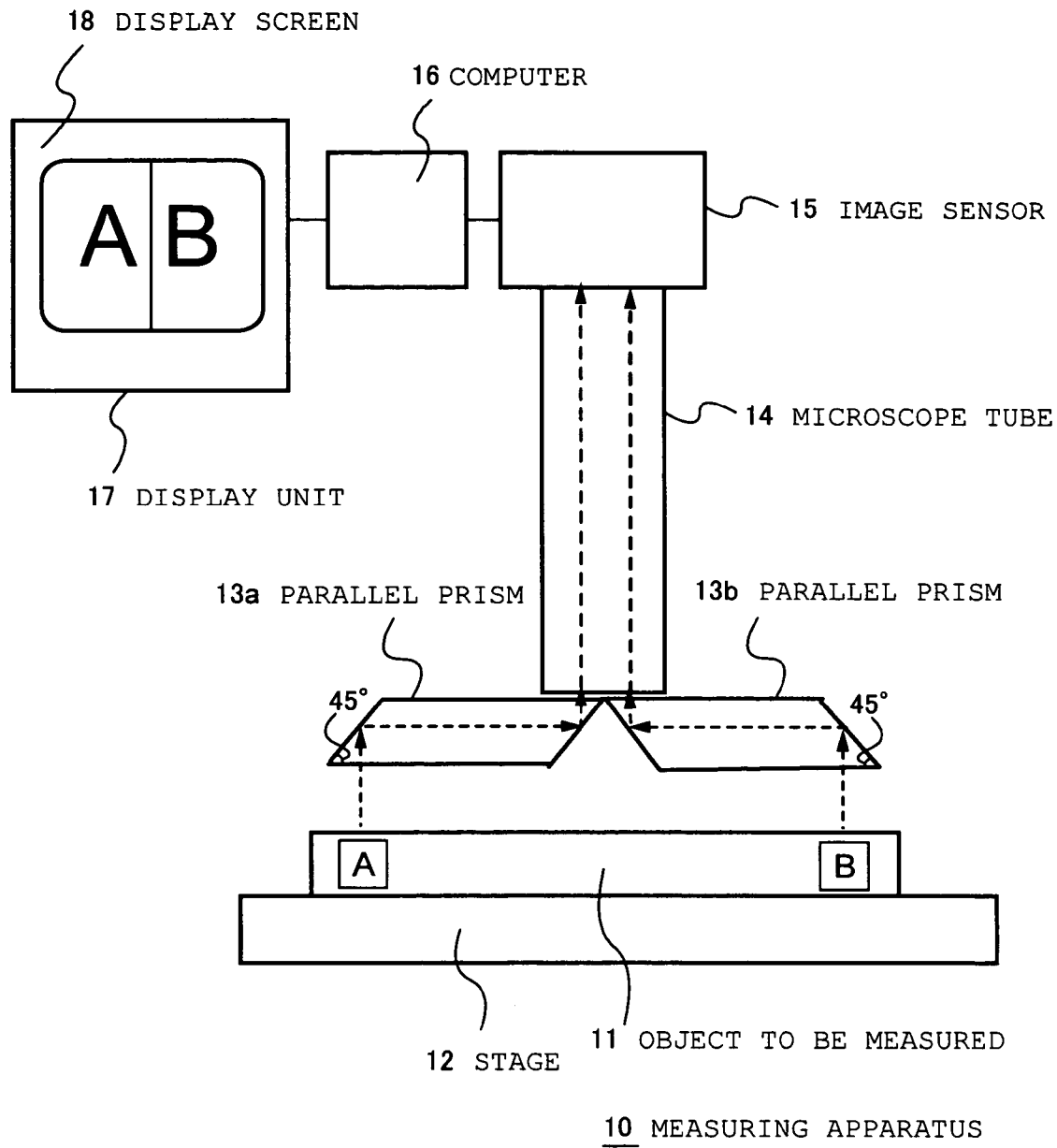
FIG. 3A and FIG. 3B are schematic configuration diagrams of the measuring apparatus according to the first embodiment of the present invention.
Figure 3B:
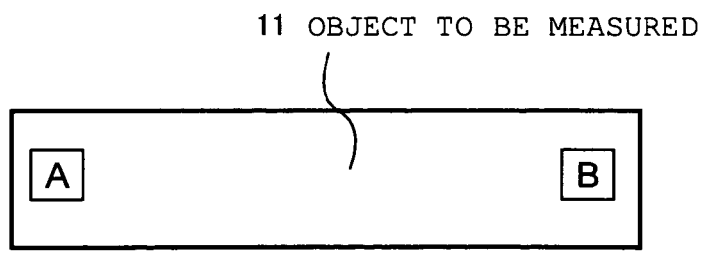

Next, FIG. 3A and FIG. 3B are referred to. FIG. 3A shows a schematic configuration of the measuring apparatus according to an embodiment of the present invention. With this apparatus, it is possible to measure a distance between multiple points at multiple locations being spaced apart from one another on one surface of the object to be measured, and mounting angle and arrangement of a part on the object to be measured. In FIG. 3A and FIG. 3B, reference numeral 11 indicates the object to be measured, numeral 12 indicates a stage to place the object to be measured 11, numerals 13a and 13b indicate parallel prisms, numeral 14 indicates a microscope tube, numeral 15 indicates an image sensor, numeral 16 indicates a computer (image processor), numeral 17 indicates a display unit, and numeral 18 indicates a display screen of the display unit. Each of the parallel prisms 13a and 13b is a kind of reflection prism, each having two pairs of parallel reflecting surfaces where one pair forms an angle of 45 degrees with the other pair, as a parallelogram prism (having two pairs of parallel two planes, and the length of one pair is not equal to the length of another pair). Each of the parallel prisms 13a and 13b, as indicated by the dotted lines in FIG. 3A, refracts an optical path incident on one end (incident side reflecting surface section), so that it is emitted from the other end (emitting side reflecting surface section) in the same direction.

FIG. 3B shows a top view of the object to be measured. For ease of explanation, in FIG. 3A, the characters "A" and "B" are shown at two points on the side surface of the object to be measured 11. However, in practice, as shown in FIG. 3B, the characters "A" and "B" are described on one surface of the measurement area. Hereinafter, the positions where those characters are described will be referred to as "Position A" and "Position B", respectively. As shown in FIG. 3A, images of the characters "A" and "B", which are located on the position A and position B respectively on the top surface of the measurement area of the object to be measured 11, are displayed on the display screen 18, in such a manner as being magnified and combined. In FIG. 3A, the dotted lines indicate an optical path reflected from the measurement area. It is to be noted here that for convenience of explaining the measuring apparatus according to the present invention, the object to be measured 11, on which the characters "A" and "B" are described, is employed as a way of example. However, as mentioned below, the measuring apparatus according to the present invention is not limited to such object to be measured 11 on which these characters are described. It is also to be noted here that "on one surface of the object to be measured" may include not only "on the same surface at multiple locations in the case where the object to be measured is molded in one piece and a single part constitutes the object", but also "on the same surface at multiple locations on the parts in the case where multiple parts constitute the object to be measured.

Figure 4:
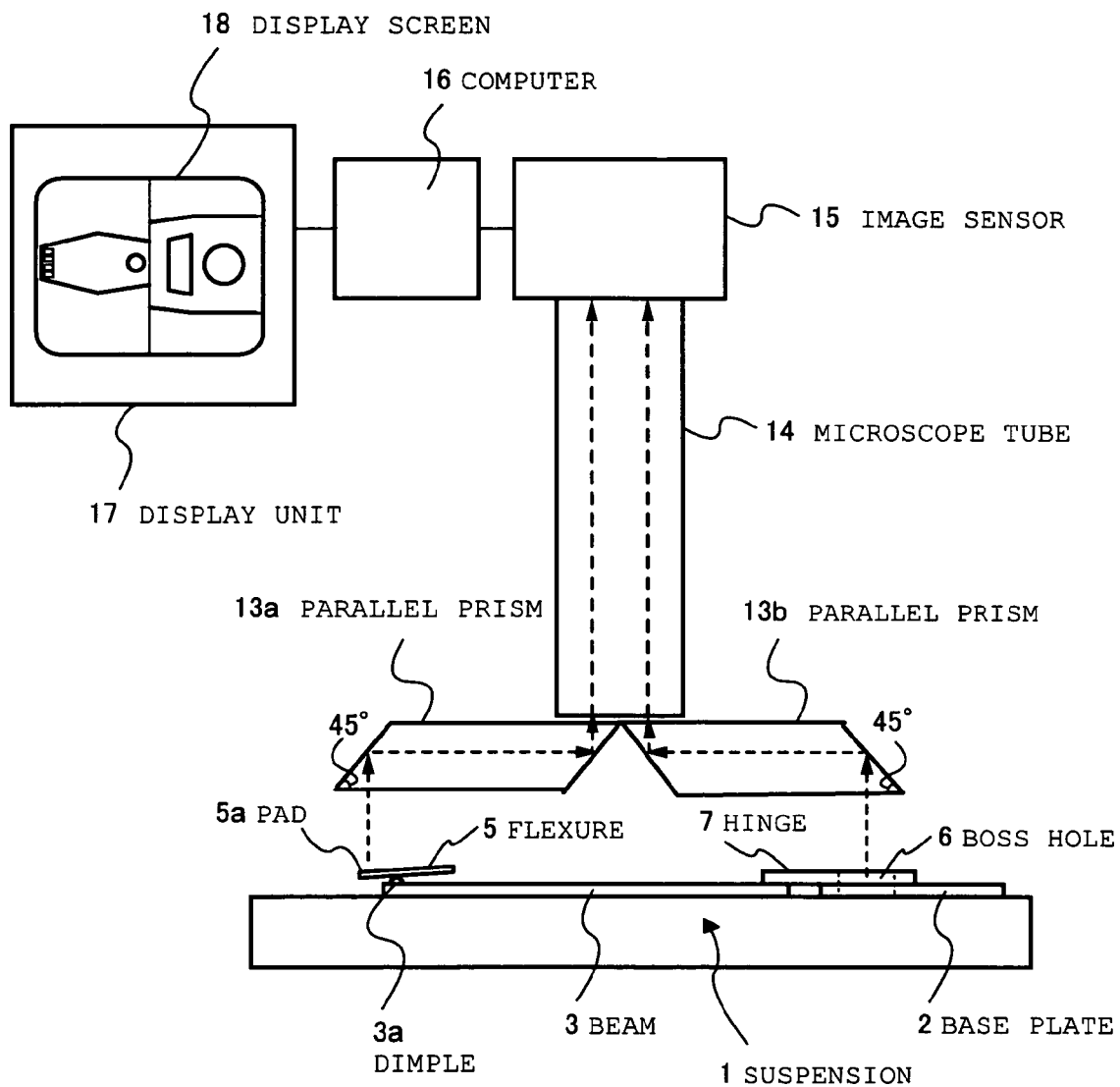
FIG. 4 is a schematic configuration diagram of the measuring apparatus according to the first embodiment of the present invention.

In FIG. 3A, one end of the parallel prism 13a and one end of the parallel prism 13b are respectively positioned above the first reference point, location A, and the second reference point, location B. The light rays reflected from the location A and the location B of the object to be measured are respectively incident upon (captured in) the parallel prisms 13a and 13b as indicated by the dotted lines respectively. Each of the parallel prisms 13a and 13b in the present embodiment refracts by 90 degrees, the light ray incident on one end (incident side reflecting surface section), makes the light ray to pass through an optical guiding section, and further refracts the light ray by 90 degrees again, whereby the light ray is refracted in the same direction as that of the initial incident light ray, and then emitted from the other end (emitting side reflecting surface section). The other ends (light emitting sections) of the parallel prisms 13a and 13b are arranged in such a manner as being adjacent to each other, the light rays from the location A and the location B are placed side by side, and just above them, an objective lens part (not illustrated) of the microscope tube 14 is positioned. The images of the location A and the location B which are converged or diverged through the microscope tube 14 are converted into electrical signals by the image sensor 15, processed by the computer 16, and displayed on one display screen 18 of the display unit 17. In the present embodiment, as shown in FIG. 3A, "A" and "B" being images of the location A and the location B are combined, and images of "A" and "B" are displayed on the display screen 18 in such a manner as being arranged side by side. It is also possible to configure such that after video signals from the image sensor 15 is captured into the computer 16 as appropriate, the signals are subjected to the image processing so as to process the images. Next, FIG. 4 is referred to. FIG. 4 shows an example that the measuring apparatus relating to the embodiment of the present invention is employed to measure the hard disk suspension 1 which has been explained with reference to FIG. 1. The suspension 1, which has been separated one by one, is placed on the stage 12, and one end of the parallel prism 13a and one end of the parallel prism 13b are respectively positioned above the location A and location B that are targets for measuring on the suspension 1. In the present embodiment, the location A and location B being targets for measuring, correspond to the pad 5a of the flexure 5 and the center of the boss hole 6, respectively.

As shown in FIG. 4, one end of the parallel prism 13a and one end of the parallel prism 13b are respectively positioned above the location A as the first location (in the proximity of the pad 5a of the flexure 5), and the location B as the second location (in the proximity of the center of the boss hole 6). The light rays reflected from the location A and the location B of the object to be measured are incident upon (captured in) the parallel prisms 13a and 13b as indicated by the dotted lines respectively. Each of the parallel prisms 13a and 13b in the present embodiment refracts the light ray incident on one end (incident side reflecting surface section) by 90 degrees, makes the light ray to pass through the optical guiding section, and further refracts the light ray by 90 degrees again, whereby the light ray is refracted in the same direction as that of the initial incident light ray, and then emitted from the other end (emitting side reflecting surface section) The other ends (emitting side reflecting surface sections) of the parallel prisms 13a and 13b adjoin to each other, the light rays from the location A and the location B are placed side by side, and just above them, an objective lens part (not illustrated) of the microscope tube 14 is positioned. The images of the location A and the location B which are converged or diverged through the microscope tube 14 are converted into electrical signals by the image sensor 15, processed by the computer 16, and displayed on one display screen 18 of the display unit 17. In the present embodiment, as illustrated in the display screen 18, the images of the pad 5a of the flexure 5 and the center of the boss hole 6 are displayed on the display screen 18 in such a manner as being combined and arranged side by side.

In the present embodiment, the images of the location A and the location B having been converted into electrical signals by the image sensor section 15 are subjected to the image processing by the computer (image processor) 16. Hereinafter, the image processing in the present embodiment will be explained. The image processing method as explained in the present embodiment is just one way of the image processing method in the measuring apparatus of the present invention, and the present invention is not limited to this example.

Figure 5:
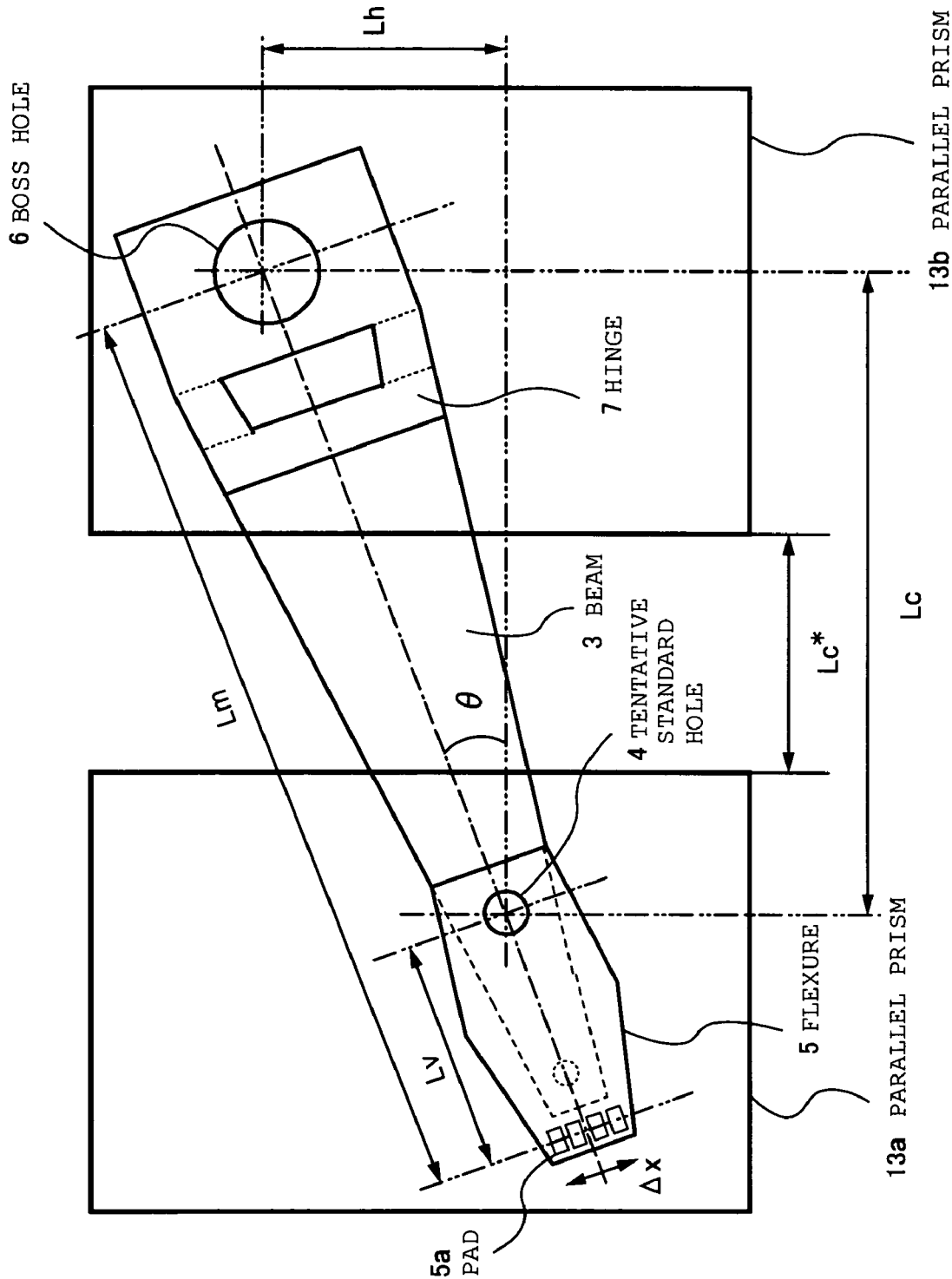
FIG. 5 is a diagram showing relations between the suspension 1 and parallel prisms 13a, 13b, in the measuring apparatus according to the first embodiment of the present invention.

FIG. 5 shows relations between the suspension 1 and the parallel prisms 13a, 13b, in the measuring apparatus according to the embodiment of the present invention. As shown in FIG. 5, the parallel prism 13a captures an image of an area including the flexure 5 and the tentative standard hole 4 of the suspension 1, and the parallel prism 13b captures an image an area including the hinge 7 and the boss hole 6 of the suspension 1. As shown in FIG. 5, at the time of starting the measurement, the hard disk suspension 1 is given an arbitrary inclination of angle θ (inclining angle between the line connecting the center of the boss hole 6 and the center of the tentative reference hole 4 (called as "reference axis"), and the horizontal axis of the screen).

In the present embodiment, the followings are obtained; distance Lm in the reference axis direction between the pad 5a and the boss hole 6, distance Lv between the pad 5a and the tentative standard hole 4, and the amount of displacement Δx of the pad 5a in the vertical axis direction with respect to the reference axis.

Here, the following formula (1) is established, if it is assumed that Lh indicates the distance between the center of the boss hole 6 and the center of the tentative standard hole 4 in the screen vertical axis direction, and Lc indicates the distance therebetween in the screen horizontal direction.

$$\theta = \arctan(Lh/Lc) \quad (1)$$

Figure 6A:
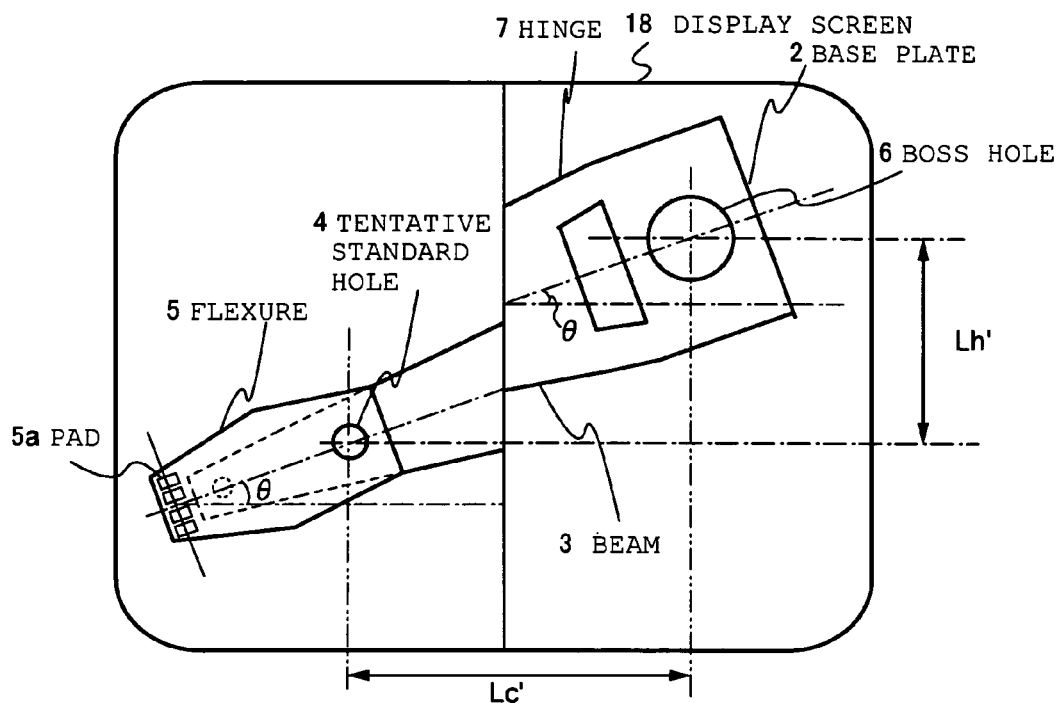
FIG. 6A and FIG. 6B are diagrams each showing a display screen 18 of the measuring apparatus according to the first embodiment of the present invention.
Figure 6B:
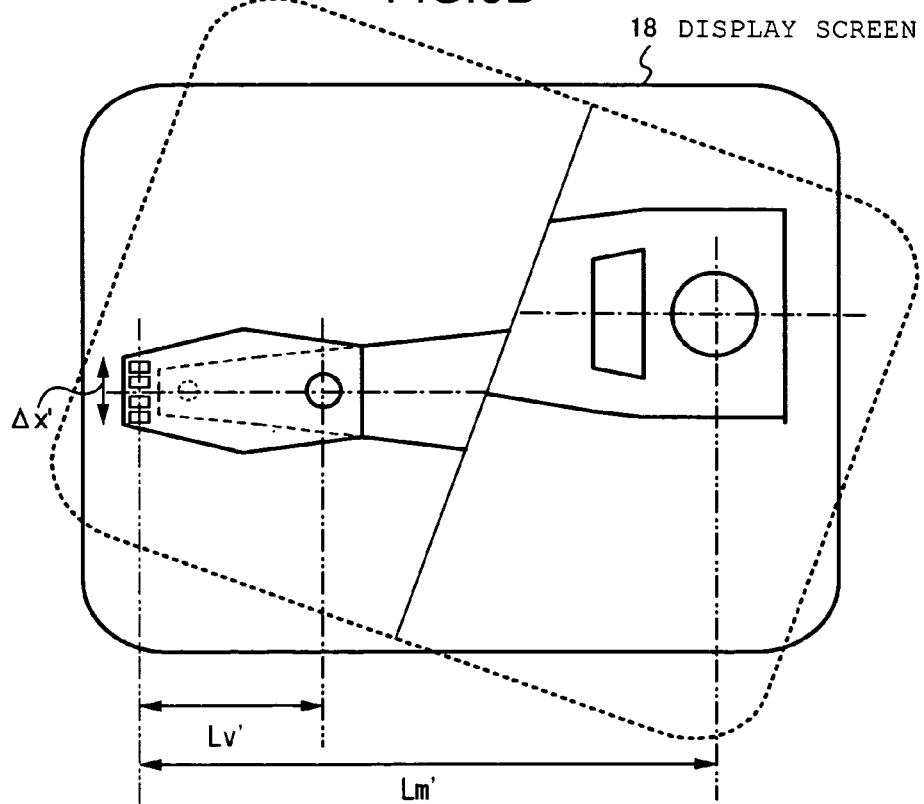

Now, FIG. 6A and FIG. 6B are referred to. Each of FIG. 6A and FIG. 6B shows a display screen 18 of the measuring apparatus according to the embodiment of the present invention. As shown in FIG. 6A, in the display screen 18, it is understood that there are two split views, and on the left view of the display screen 18, there is displayed an image of the area including the flexure 5 and the tentative standard hole 4 of the suspension 1, and on the right view of the displays screen 18, there is displayed an image of the area including the hinge 7 and the boss hole 6 of the suspension 1.

Here, according to calibration, distance Lc* between the parallel prisms 13a and 13b, screen horizontal direction magnification a, and screen vertical direction magnification b are obtained in advance as initial parameters for processing.

As shown in FIG. 6A, the following formulas (2) to (4) are established, if it is assumed that Lh' indicates the distance on the display screen 18 between the center of the boss hole 6 and the center of the tentative standard hole 4 in the screen vertical axis direction, and Lc' indicates the distance therebetween in the screen horizontal direction.

$$Lc = a \cdot Lc' + Lc^* \quad (2)$$

$$Lh = b \cdot Lh' \quad (3)$$

$$\theta = \arctan(Lh/Lc) \quad (4)$$
$$= \arctan(b \cdot Lh'/a \cdot Lc' + Lc^*)$$

According to the formula (4), it is possible to obtain the value of θ.

Next, it is possible to obtain a state of the display screen 18 as shown in FIG. 6B, when the computer 16 rotates the suspension 1 on the display screen 18 only by angle θ. In this state, the following formulas (5) to (7) are established, if it is assumed that Lv' indicates the distance between the pad 5a and the center of the tentative standard hole 4 in the reference axis direction on the display screen 18, Lm' indicates the distance between the center of the boss hole 6 and the pad 5a in the reference axis direction on the display screen 18, and Δx' indicates the amount of displacement of the pad 5a in the vertical axis direction with respect to the reference axis on the display screen 18.

$$Lv = a \cdot Lv' \quad (5)$$

$$\Delta x = b \cdot \Delta x' \quad (6)$$

$$Lm = a \cdot Lm' + \arccos(Lc^*) \quad (7)$$

As thus described, in the present embodiment, it is possible to accurately obtain the distance Lm between the pad 5a and the boss hole 6 in the reference axis direction, the distance Lv between the pad 5a and the tentative standard hole 4, and the amount of displacement Δx of the pad 5a in the vertical axis direction with respect to the reference axis. Furthermore, in the present embodiment, a distance scale (not illustrated) or an angle scale (not illustrated), which measures a coordinate value or the angle of the image on the display screen, may be displayed together on the screen.

As thus described, according to the image on the display screen as shown in FIG. 6A and FIG. 6B, or by applying image processing on the image, a coordinate position and a distance of each portion can be measured. Therefore, it is possible to measure the distance between the boss hole 6 and the pad 5a, symmetry (amount of displacement) of the pad 5a with respect to the axis connecting the center of the boss hole 6 and the center of the tentative standard hole 4, alignment of the base plate 2 and the pad 5a, and the like.

In the present embodiment, the parallel prisms 13a and 13b are employed, but a diamond prism may be employed. Alternatively, multiple prisms may be combined so that the light ray incident on one end is refracted by 90 degrees, made to pass through the optical guiding section, and further refracted by 90 degrees again, whereby the light ray is refracted in the same direction as that of the initial incident light ray and then emitted from the other end.

In the present embodiment, two parallel prisms are employed to measure two separated locations on one screen. It is further possible to employ three or more parallel prisms to measure multiple locations spaced apart from one another.

In the present embodiment, the parallel prisms 13a and 13b are employed. Alternatively, it is possible to place two rectangular prisms respectively on the positions corresponding to both ends of each of the parallel prisms 13a and 13b, thereby achieving the same function as the parallel prisms 13a and 13b. In other words, two rectangular prisms are arranged in such a manner as separated by a certain distance, and as indicated by the dotted lines in FIG. 3A, the light ray incident on one end of one rectangular prism is emitted from the other end thereof, being refracted by 90 degrees, subsequently, the light ray incident on one end of the other rectangular prism is emitted being refracted by 90 degrees again, and those light rays are incident on the optical lens within the microscope tube 14. In such a way as described above, two rectangular prisms can substitute for one parallel prism.

In the present embodiment, images of multiple locations being spaced apart on one surface of the object to be measured 11 are displayed on one screen. It is further possible to place a parallel prism or a reflecting prism on the side surface of the object to be measured 11, the light ray reflected from the side surface is captured in the optical lens in the microscope tube 14, and an image of the side surface of the object to be measured 11 is displayed on the display screen 18 concurrently with the above images, so that the alignment measurement is performed.

As described above, with the measuring apparatus and the measuring method of the present invention, it is possible to measure on one screen, two locations which are spaced apart, by use of only one optical system. Therefore, it is possible to measure accurately a distance between multiple points on spaced-apart multiple locations, alignment of each component, and the like.

In addition, with the measuring apparatus and the measuring method of the present invention, a parallel prism is used to refract the optical path by 90 degrees with respect to the height direction, just above the object to be measured. Therefore, it is possible to reduce the size and height (work distance) of the optical system, thereby downsizing the measuring apparatus.

EMBODIMENT 1

Some of the objects to be measured may have a structure that the locations to be measured do not exist on one surface of the object, and they may exist on the front surface and the back surface. Due to the structural feature of the measuring apparatus, it may be difficult to measure the target two locations from one particular surface side. In view of the above problems, in the present embodiment, a measuring apparatus and a measuring method of the present invention will be explained, with which the above situation can be handled. Since the same constituent elements explained in the above embodiment are labeled the same in this example, tedious explanations will not be given here.

Figure 7A:
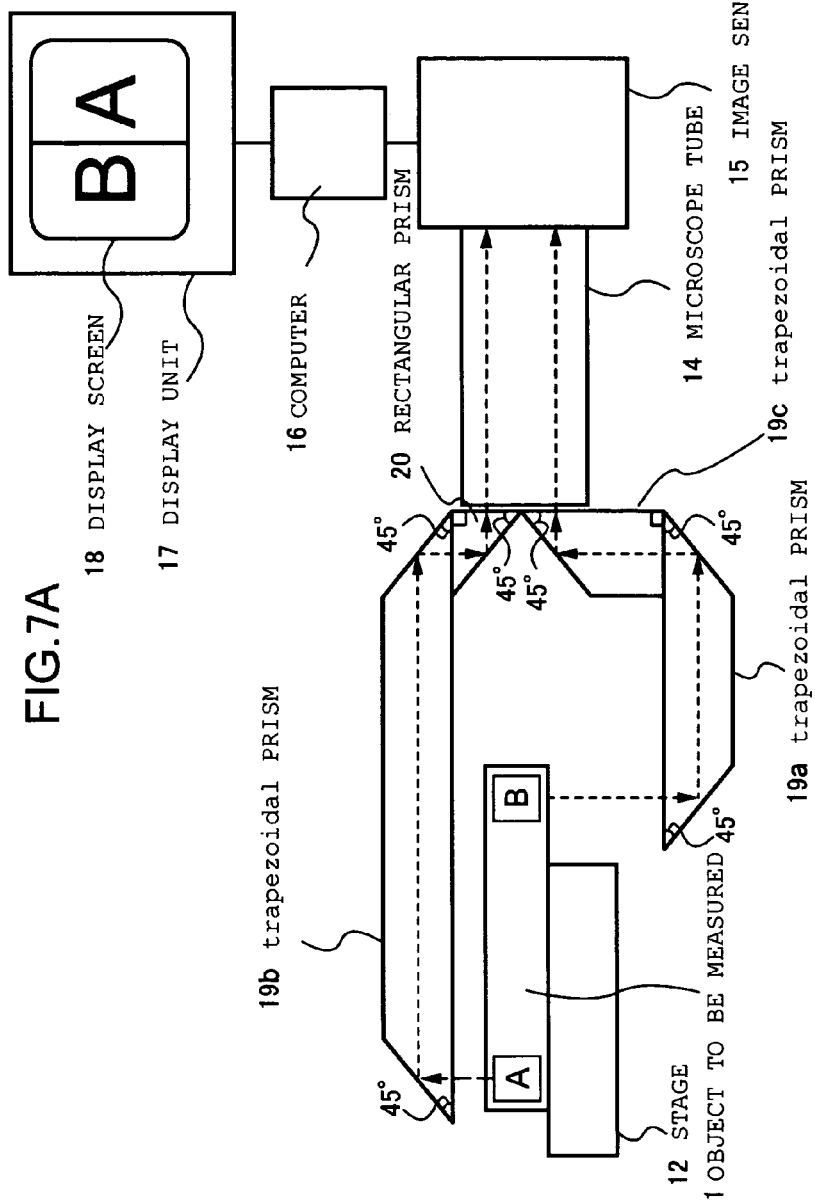
FIG. 7A, FIG. 7B, and FIG. 7C are schematic configuration diagrams of the measuring apparatus according to the first embodiment of the present invention.

FIG. 7A is referred to here. In the present embodiment, trapezoidal prisms 19a, 19b and 19c, and a rectangular prism 20 are employed. The trapezoidal prism is a kind of reflection prism, and it is formed by cutting the vertical angle part of the rectangular prism to be parallel with the bottom surface. In the present embodiment, the trapezoidal prisms 19a and 19b each forming 45 degrees between the bottom surface and the both side surfaces, that is, having two reflecting surfaces, and the trapezoidal prism 19c forming 90 degrees between the bottom surface and one side surface, and 45 degrees between the bottom surface and the other side surface. As indicated by the dotted lines in FIG. 7A, each of the trapezoidal prisms 19a and 19b refracts the optical path of the light ray incident onto one end (incident side reflecting surface section) of each of the prism 19a and the prism 19b, and emits the light rays from the other end (emitting side reflecting surface section) of each prism in the opposite direction, that is, the direction different by 180 degrees. The trapezoidal prism 19c is a modification of rectangular prism, and as indicated by the dotted lines in FIG. 7A, this trapezoidal prism 19c has one reflecting surface which refracts the light ray incident onto one end by 90 degrees, and emits the light from the other end. The rectangular prism is a kind of reflection prism. The rectangular prism 20 used in the present embodiment is a prism having one reflecting surface, forming 45 degrees between the bottom surface and the sloping surface. A combination of these prisms is not limited to the above example. Alternatively, another multiple prisms may be combined so as to achieve the purpose and operations of the present invention.

Figure 7C:
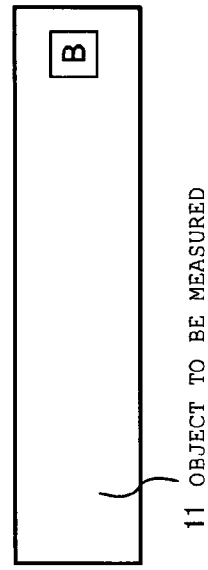
Figure 7B:
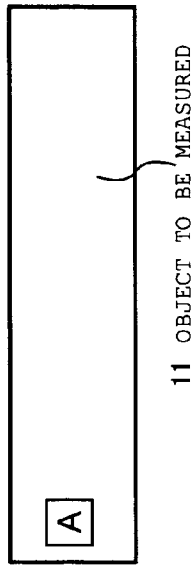

As shown in FIG. 7A, the object to be measured 11 is placed on the stage 12. For ease of explanation, in FIG. 7A, characters "A" and "B" are shown on two points on the side surface of the object to be measured 11. However, in practice, as shown in the top view (front view) of FIG. 7B, the character "A" is described at one point on the top surface (front surface) of the measurement area, and as shown in the bottom view (back view) of FIG. 7C, the character "B" is described at one point on the bottom surface (back surface) of the measurement area. Hereinafter, those points on which the characters are described will be referred to as "location A" and "location B", respectively. As shown in FIG. 7A, an image of "A" placed at location A and an image of "B" placed at location B, respectively, on the top surface and on the bottom surface of the measurement area of the object to be measured 11, are magnified and combined to be displayed on the display screen 18. In FIG. 7A, the dotted lines indicate reflected optical paths from the target measurement area.

In FIG. 7A, one end of the trapezoidal prism 19a and one end of the trapezoidal prism 19b (incident side reflecting surface sections) are respectively positioned above the location A as the first location, and below the location B as the second location. The light rays reflected from the location A and the location B of the object to be measured are incident upon (captured in) the trapezoidal prisms 19a and 19b, respectively, as indicated by the dotted lines. Each of the trapezoidal prisms 19a and 19b in the present embodiment refracts by 90 degrees the light ray incident on one end, makes the light ray to pass through the optical guiding section, and further refracts the light ray by 90 degrees again, whereby the light ray is refracted in the direction opposite to that of the initial incident light ray, and then emitted from the other end. The lights ray emitted from the other end of the trapezoidal prism 19a and from the other end of the trapezoidal prism 19b, are incident respectively on the rectangular prism 20 and the trapezoidal prism 19c, each light ray is emitted in the same direction, and guided to the objective lens part (not illustrated) in the microscope tube 14. By use of the trapezoidal prism 19c, the distance from the location A to the objective lens part (not shown) is made to be equal to the distance from the location B to the objective lens part (not shown). As thus described, by placing the rectangular prism 20 and the trapezoidal prism 19c at the objective part of the tube, the optical path lengths from the location A and from the location B up to the objective lens part (not illustrated) in the microscope tube 14 are aligned, thereby allowing a measurement of light rays reflected from the two locations A and B with the same focus. Instead of the rectangular prism 20 and the trapezoidal prism 19c, a parallel prism or the combination thereof may be employed. Furthermore, the rectangular prism 20 and the trapezoidal prism 19c to align the optical path lengths are not limited to the above-described shapes, and it is needless to say that those aligned optical path lengths can be obtained by a combination of prisms having shapes different from the present embodiment.

The other end of the rectangular prism 20 and the other end of the trapezoidal prism 19c (emitting side reflecting surface sections) adjoin each other, the light rays from the location A and the location B are arranged side by side, and immediately thereabove (immediately on the side thereof), the objective lens part (not illustrated) of the microscope tube 14 is placed. The images of the location A and the location B which are converged or diverged through the microscope tube 14 are converted into electrical signals by the image sensor 15, and displayed on one display screen of the display unit 17. In the present embodiment, as shown in FIG. 7A, "A" and "B" being images of the location A and the location B are combined, and the images of "A" and "B" are displayed on the display screen 18 in such a manner as being arranged side by side. It is to be noted that video signals from the image sensor 15 may be captured in the computer or the like, as appropriate, and processed.

Figure 8:
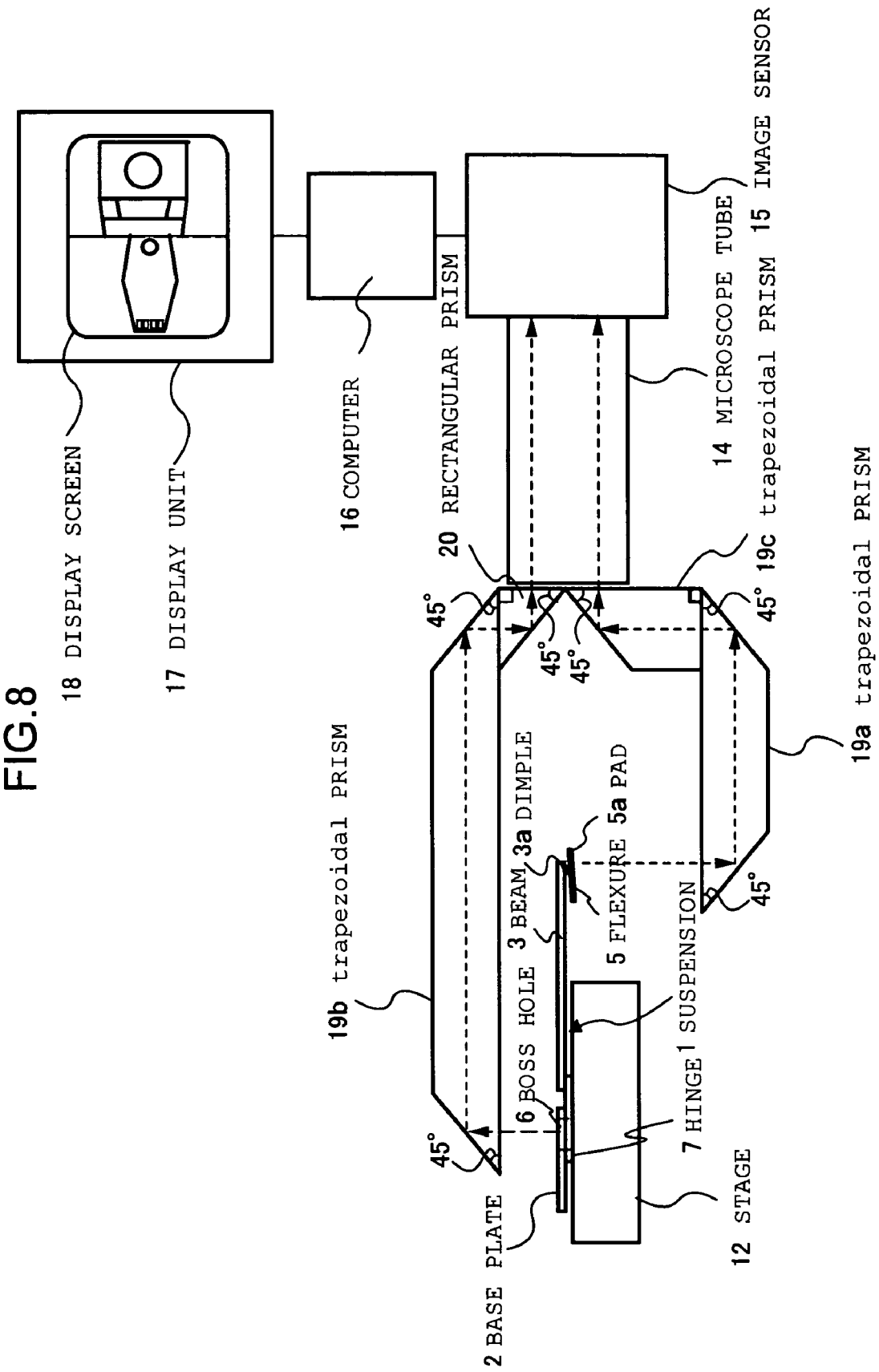
FIG. 8 is a schematic configuration diagram of the measuring apparatus according to the first embodiment of the present invention.

Next, FIG. 8 is referred to. FIG. 8 shows an example where the measuring apparatus according to the embodiment of the present invention is applied to measurement of the hard disk suspension 1, which has been explained with reference to FIG. 1. On the stage 12, the suspension 1 in a state of being connected to the work frame 8 is placed, and one end of the trapezoidal prism 19a and one end of the trapezoidal prism 19b are respectively set at the location A and the location B, which are targets for measurement on the suspension 1. In the present embodiment, the location A and the location B as targets for measurement are respectively positioned in the proximity of the pad 5a of the flexure 5, and in the proximity of the center of the boss hole 6. It is needles to say that the suspension 1, being separated from the work frame 8 one by one, may be used to be measured by the measuring apparatus of the present embodiment.

As shown in FIG. 8, one end of the trapezoidal prism 19a and one end of the trapezoidal prism 19b are respectively placed above the location A being the first location (in the proximity of the pad 5a of the flexure 5), and below the location B being the second location (in the proximity of the center of the boss hole 6), and the light rays reflected from the location A and the location B on the object to be measured are incident on (captured in) the trapezoidal prisms 19a and 19b respectively, as indicated by the dotted lines. Each of the trapezoidal prisms 19a and 19b in the present embodiment refracts the light ray incident on one end by 90 degrees, makes the light ray to pass through the optical guiding section, and further refracts the light ray by 90 degrees again, whereby the light ray is refracted in the direction opposite to that of the initial incident light ray, and then emitted from the other end. The light rays emitted from the other end of the trapezoidal prism 19a and from the other end of the trapezoidal prism 19b, are incident respectively on the rectangular prism 20 and the trapezoidal prism 19c, each light ray is emitted in the same direction, and guided to the objective lens part (not illustrated) in the microscope tube 14. The images of the location A and the location B which are converged or diverged through the microscope tube 14 are converted into electrical signals by the image sensor 15, and displayed on one display screen of the display unit 17. In the present embodiment, as shown in the display screen 18, the image of the pad 5a of the flexure 5 and the image of the center of the boss hole 6 are combined and displayed in such a manner as being arranged side by side.

Details as to the display screen 18 are the same as shown in FIG. 6A. According to the image on the display screen as shown in FIG. 6A, or by applying image processing on this image, a coordinate position of each part and a distance therebetween can be measured. Therefore, it is possible to measure the distance between the boss hole 6 and the pad 5a, symmetry of the pad 5a with respect to the axis connecting the center of the boss hole 6 and the center of the tentative standard hole 4, alignment of the base plate 2 and the pad 5a, and the like.

In the present embodiment, images on multiple locations being placed on the front and backside of the object to be measured 11 are displayed on one screen. It is further possible to place a parallel prism or a reflecting prism on the side of the object to be measured 11, the light ray reflected from the side surface is captured in the optical lens in the microscope tube 14, and the image of the side surface of the object to be measured 11 is displayed on the display screen 18 concurrently with the above images, so that the alignment measurement is performed.

In the present embodiment, the trapezoidal prisms 19a and 19b are employed, but a diamond prism or a rectangular prism may be also applicable. Alternatively, multiple prisms may be combined so that the light ray incident on one end is refracted by 90 degrees, passes through the optical guiding section, and further refracted by 90 degrees again, whereby the light ray is refracted in the direction opposite to that of the initial incident light ray, and then emitted from the other end.

Multiple objects to be measured 11 are placed on the stage 12, light rays reflected from the location A and the location B of each of the objects 11 are collected into the optical lens within the microscope tube 14, by use of the trapezoidal prisms 19a and 19b, and the rectangular prism 20 and the trapezoidal prism 19c, installed above those locations, and gathered to one image sensor 15. Accordingly, it is possible to display images of the location A and the location B of the multiple objects to be measured 11 simultaneously on the display screen 18, in such a manner as being arranged side by side.

In the present embodiment, the trapezoidal prisms 19a and 19b are employed. However, instead of the trapezoidal prisms, it is also possible to place two rectangle prisms respectively at the positions of both ends of the trapezoidal prisms 19a and 19b each, thereby providing the same function as those of the trapezoidal prisms 19a and 19b. In other words, it is possible to configure such that instead of the trapezoidal prism 19a, two rectangle prisms are arranged with a certain distance. Then, as indicated by the dotted lines in FIG. 7A, the light ray incident on one end of one of the rectangular prisms is emitted from the other end being refracted by 90 degrees, and subsequently, the light ray incident on one end of the other rectangular prism is emitted from the other end being refracted by 90 degrees, thereby allowing the light ray to incident upon the rectangular prism 20. With the configuration above, one trapezoidal prism can be replaced by two rectangular prisms.

As thus described, according to the measuring apparatus and the measuring method relating to the embodiment of the present invention, by use of one optical system, it is possible to measure on one screen, two locations being spaced apart and positioned on different surfaces, and accurate measurement of distance or the like between multiple points can be achieved. Further according to the embodiment of the present invention relating to the measuring apparatus and the measuring method, it is possible to measure the angle of patterns or the like positioned on multiple locations being spaced apart.

In addition, according to the present invention relating to the measuring apparatus and the measuring method, a trapezoidal prism is used to refract the optical path by 90 degrees with respect to the height direction immediately above the object to be measured. Therefore, it is possible to reduce the size and height (work distance) of the optical system, thereby downsizing the measuring apparatus.

EMODIMENT 2

In the present embodiment, an example will be explained in which a way for arranging multiple suspensions 1 is changed so that they are measured simultaneously, in the measuring apparatus and measuring method as described in the above embodiment with reference to FIG. 3.

Figure 9:
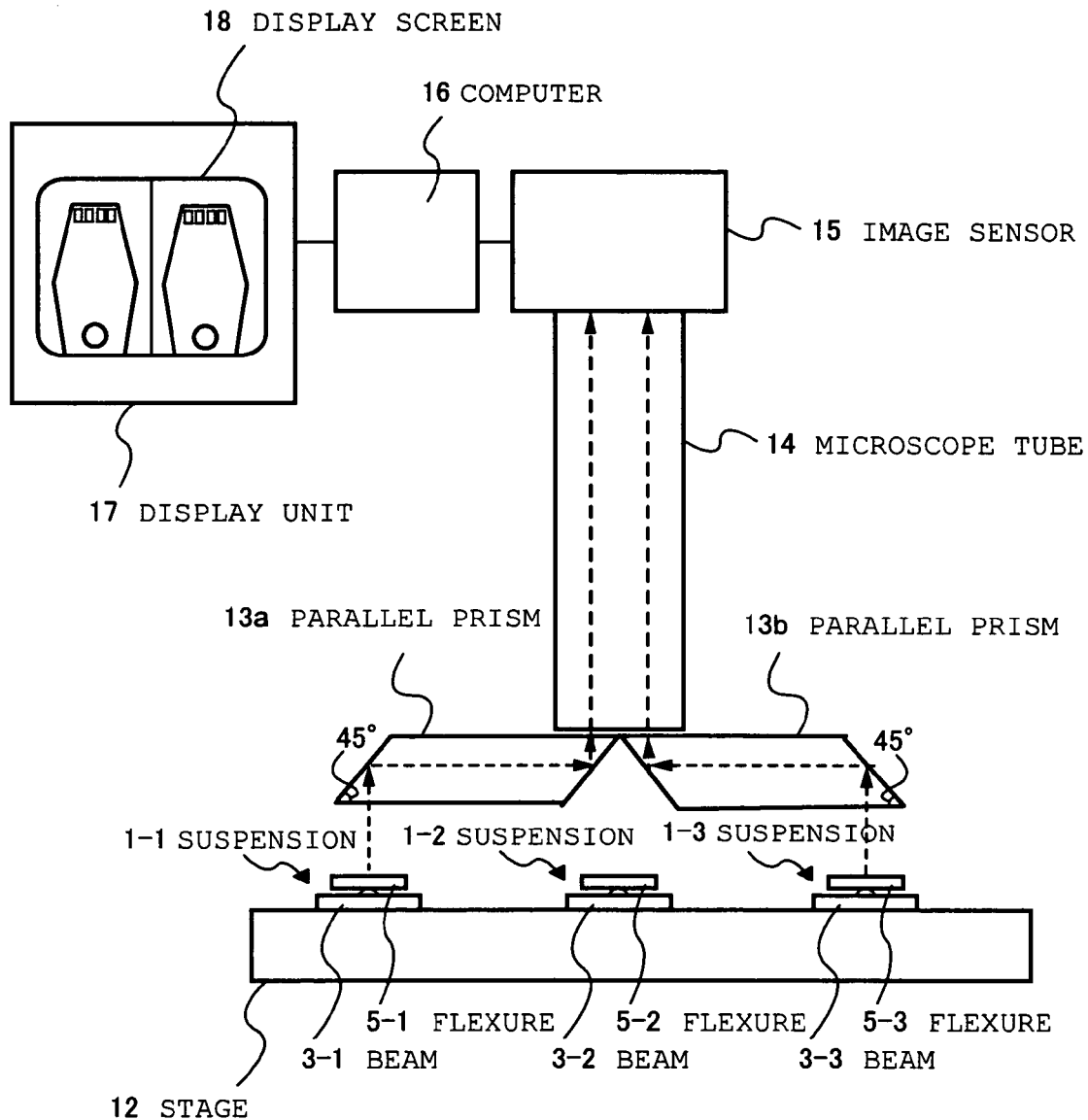
FIG. 9 is a schematic configuration diagram of the measuring apparatus according to the first embodiment of the present invention.

FIG. 9 is referred to here. FIG. 9 shows an example where the measuring apparatus according to an embodiment of the present invention is applied in measuring a suspension part of hard disk which has been explained with referred to FIG. 1. In the present embodiment, three suspensions 1-1, 1-2, and 1-3 are placed on the stage 12, in such a manner that the longitudinal direction thereof are directed to the perpendicular direction of the sheet on which FIG. 9 is drawn. FIG. 9 further shows beams 3-1, 3-2, and 3-3 and flexure 5-1, 5-2, and 5-3, which constitute the suspensions respectively. Those suspensions 1-1, 1-2, and 1-3 may be separated one by one, or they may be in a status before separated from the work frame 8. As shown in FIG. 9, one end of the parallel prisms 13a and one end of the parallel 13b are set respectively above the flexures 5-1 and 5-3 of the suspensions 1-1 and 1-3 which are targets for measurement. If these suspensions 1-1, 1-2, and 1-3 are formed as one piece with the work frame 8, the flexures 5-1, 5-2, and 5-3 of those suspensions 1-1, 1-2, and 1-3 are continuously measured, by moving the work frame 8 in the lateral direction (or moving the stage 12 in the lateral direction).

As shown in FIG. 9, one end of the parallel prism 13a and one end of the parallel prism 13b are respectively placed above the location A being the first location (in the proximity of the pad 5a of flexure 5-1), and above the location B being the second location (in the proximity of the pad 5a of flexure 5-3), and the light rays reflected from the location A and the location B on the object to be measured are incident on (captured in) the parallel prisms 13a and 13b respectively, as indicated by the dotted lines. Each of the parallel prisms 13a and 13b in the present embodiment refracts the incident light ray on one end by 90 degrees, makes the light ray to pass through the optical guiding section, and further refracts the light ray by 90 degrees again, whereby the light ray is refracted in the same direction as that of the initial incident light ray and then emitted from the other end. The other end of the parallel prism 13a and the other end of the parallel prism 13b (emitting side reflecting surface sections) adjoin each other, the light rays from the location A and the location B are arranged side by side, and immediately thereabove the objective lens part (not illustrated) of the microscope tube 14 is placed. The images of the location A and the location B which are converged or diverged through the microscope tube 14 are converted into electrical signals by the image sensor 15, and displayed on one display screen of the display unit 17. In the present embodiment, as shown in the display screen 17, the image of the pad 5a-1 of the flexure 5-1 and the image of the pad 5a-3 of the flexure 5-3 are combined and displayed in such a manner as being arranged side by side.

As thus described, according to the measuring apparatus of the present embodiment, by use of one optical system and one image sensor, it is possible to measure mounting locations of the pads 5a of multiple suspensions, mounting angle of each part, distance between each part, and alignment, all at once, thereby achieving a downsizing of the measuring apparatus. It is further possible to achieve a speedup in checking appearance of each suspension and inspecting detect thereof.

EMBODIMENT 3

In the present embodiment, another example of the measuring apparatus and the measuring method of the present invention will be explained, with which it is possible to handle a situation where locations to be measured exist on both the front surface and the back surface, not on one surface of the object to be measured. Since the same constituent elements explained in the above Embodiment 1 are labeled the same, tedious explanations will not be given here.

Figure 10:
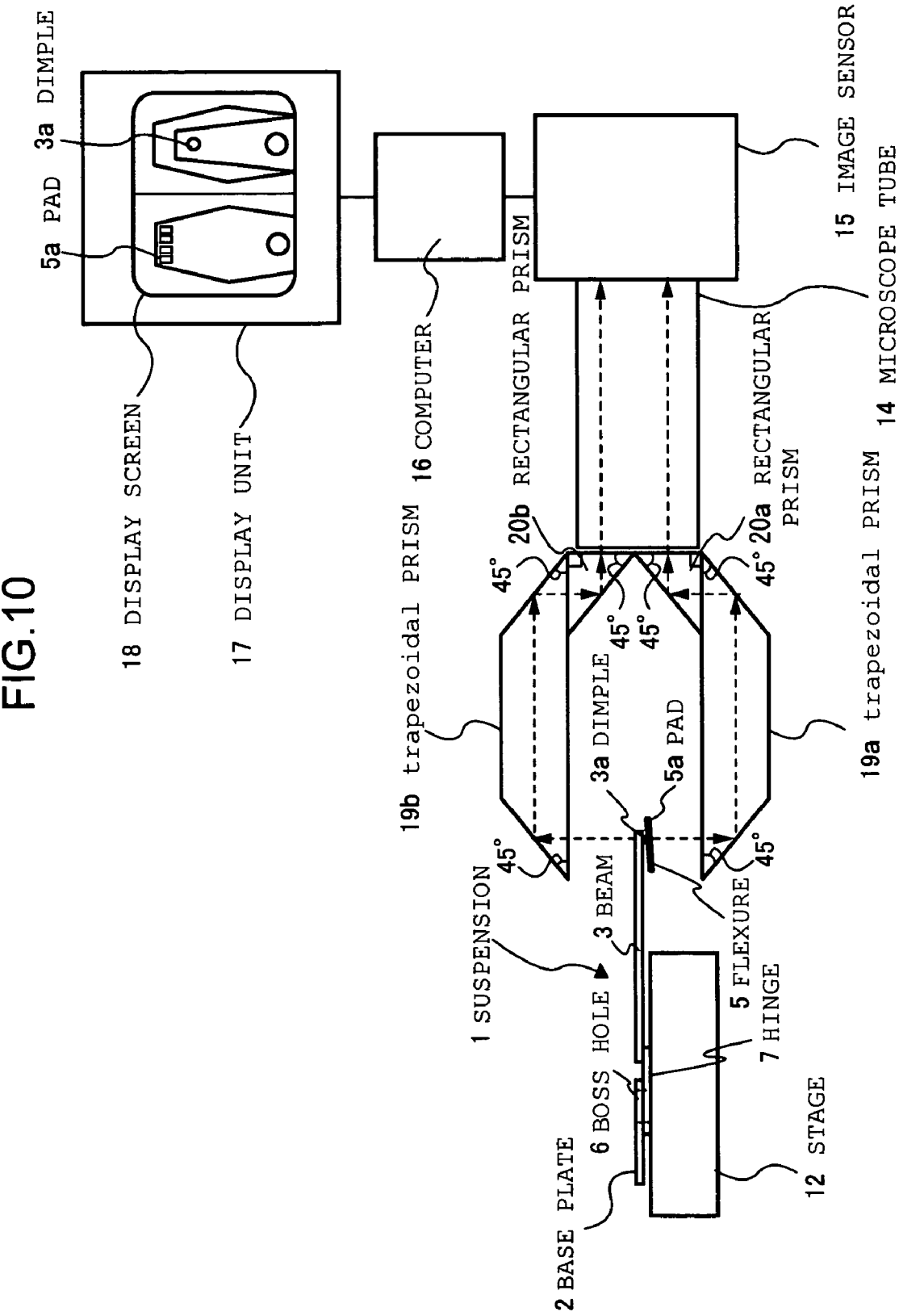
FIG. 10 is a schematic configuration diagram of the measuring apparatus according to the first embodiment of the present invention.
Figure 11:
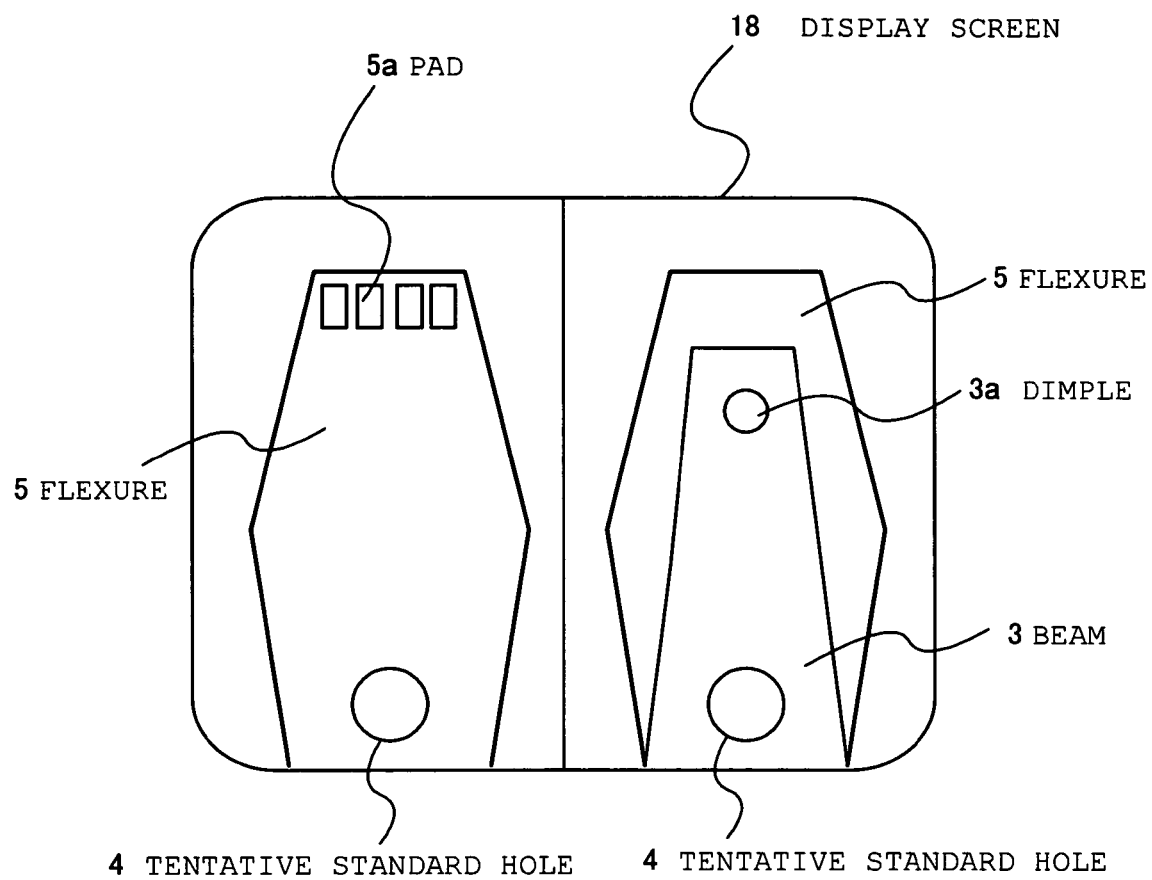
FIG. 11 is a diagram showing a display screen 18 of the measuring apparatus according to the first embodiment of the present invention.
Figure 12:
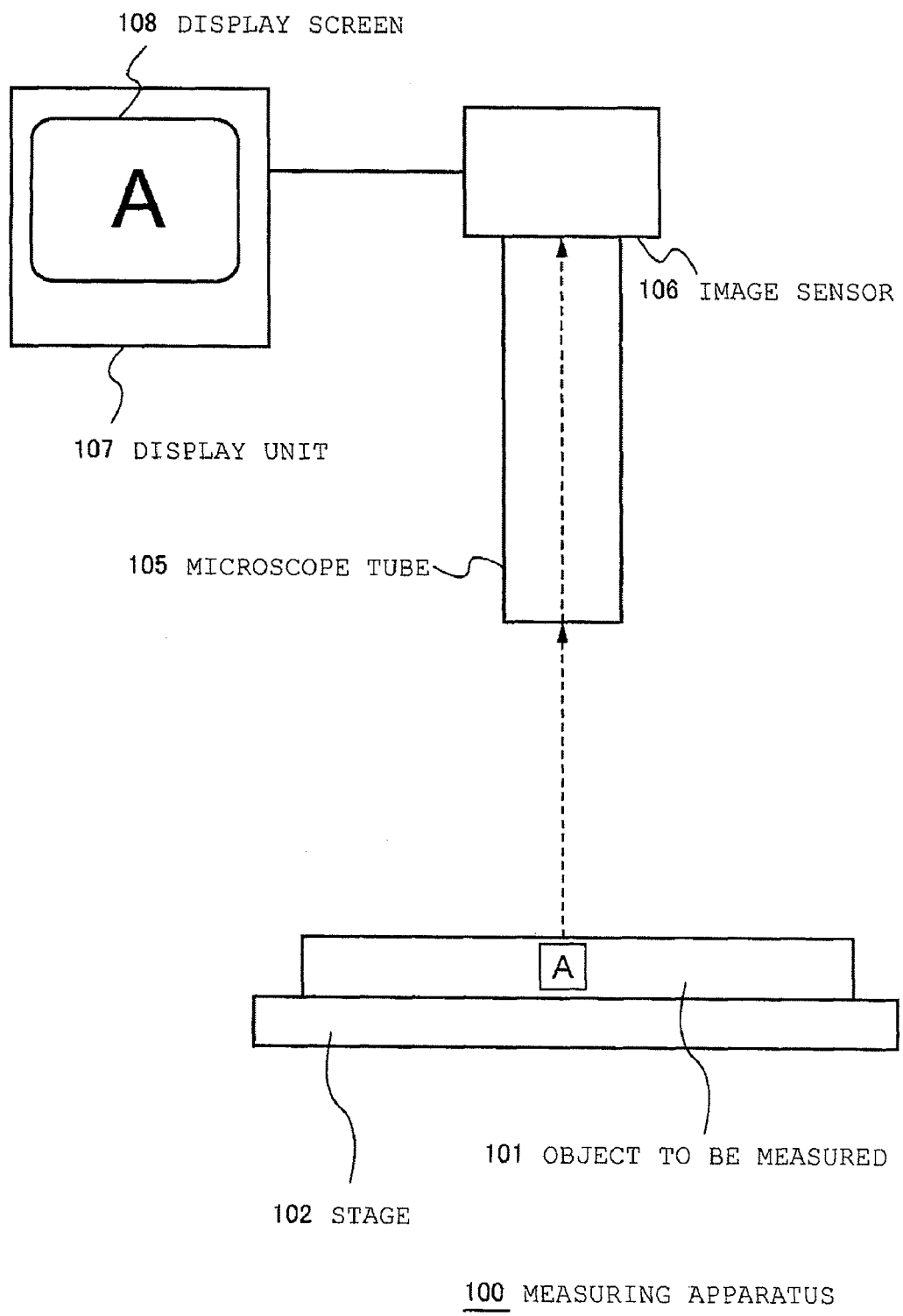
FIG. 12 is a schematic configuration diagram showing a conventional measuring apparatus.
Figure 13A:
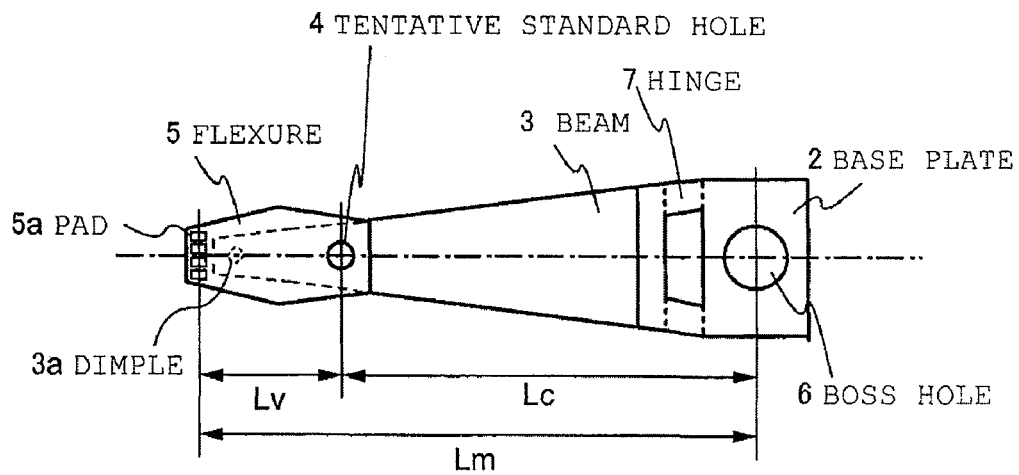
FIG. 13A and FIG. 13B are diagrams showing a hard disk use suspension.
Figure 13B:
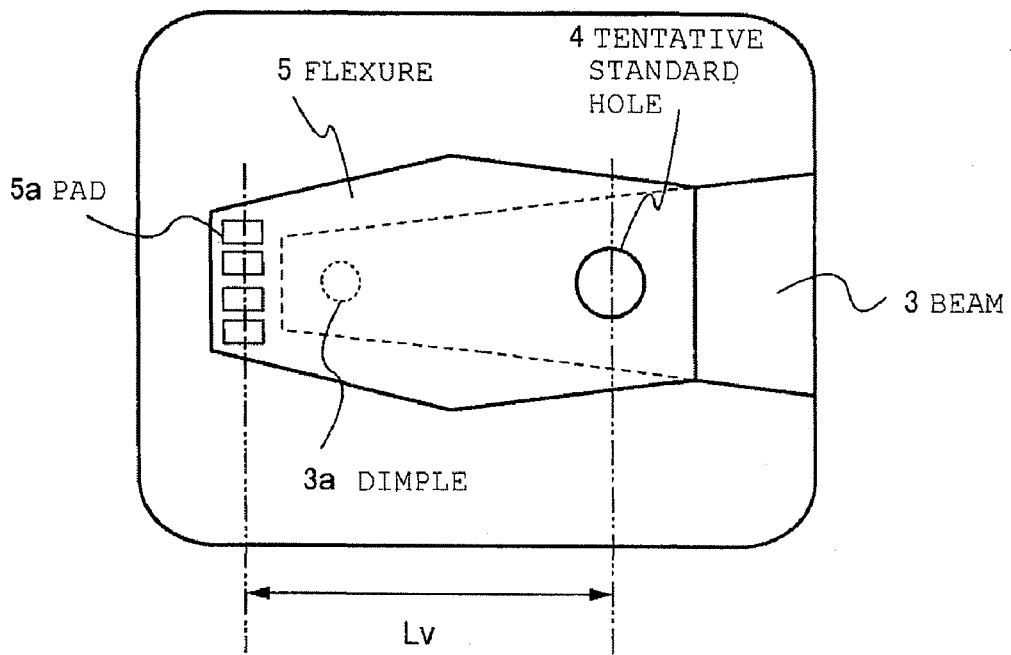

FIG. 10 is referred to here. FIG. 10 shows an example where the measuring apparatus according to one embodiment of the present invention is used for measuring the hard disk suspension 1 that has been explained with reference to FIG. 1. In the present embodiment, trapezoidal prisms 19a and 19b, and rectangular prisms 20a and 20b are employed. In the present embodiment, two trapezoidal prisms 19a and 19b are used, each having two reflecting surfaces and forming 45 degrees between the bottom surface and the both side surfaces. As indicated by the dotted lines in FIG. 10, each of the trapezoidal prisms 19a and 19b refracts the optical path of the light ray incident on one end (incident side reflecting surface section), and emits the light ray from the other end in the opposite direction, that is, the direction different by 180 degrees. In the present embodiment, the rectangular prisms 20a and 20b are prisms having one reflecting surface which forms 45 degrees between the bottom surface and the sloping surface. A combination of these prisms is not limited to the above example. Alternatively, another multiple prisms may be combined so as to achieve the purpose and operations of the present invention.

On the stage 12, the suspension 1 in a state of being connected to the work frame 8 is placed, and one end of the trapezoidal prism 19a and one end of the trapezoidal prism 19b are respectively set below the portion where the pad 5a of the flexure 5 (location A), and above the portion on which dimple 3a of the beam 3 is formed on the back of the surface on which the flexure 5 is mounted (location B), as targets for measurement on the suspension 1. In other words, in the present embodiment, a particular location on the suspension 1 is measured from front-back both sides. It is needles to say that the suspension 1, being separated from the work frame 8 one by one, may be a target for measurement by the measuring apparatus of the present embodiment.

As shown in FIG. 10, one end of the trapezoidal prism 19a and one end of the trapezoidal prism 19b are respectively placed below the location A being the first location (in the proximity of the pad 5a), and above the location B being the second location (in the proximity of the dimple 3a), and the light rays reflected from the location A and the location B on the object to be measured are incident on (captured in) the trapezoidal prisms 19a and 19b respectively, as indicated by the dotted lines. Each of the trapezoidal prisms 19a and 19b in the present embodiment refracts the incident light ray on one end by 90 degrees, makes the light ray to pass through the optical guiding section, and further refracts the light ray by 90 degrees again, whereby the light ray is refracted in the direction opposite to that of the initial incident light ray, and then emitted from the other end. The light rays emitted from the other end of the trapezoidal prism 19a and from the other end of the trapezoidal prism 19b, are incident respectively on the rectangular prisms 20a, 20b, each light ray is emitted in the same direction, and guided to the objective lens part (not illustrated) in the microscope tube 14. The images of the location A and the location B which are converged or diverged through the microscope tube 14, converted into electrical signals by the image sensor 15, and displayed on one display screen 18 of the display unit 17. As shown in the display screen 11, the image of the pad 5a and the dimple 3a are combined and displayed in such a manner as being arranged side by side.

As described above, by displaying the front and back side images of the location where the flexure 5 of the suspension 1 is mounted, are displayed simultaneously side by side, it is possible to easily check the alignment and the like of the pad 5a with respect to the dimple 3a.

It is further possible to place multiple objects to be measured 11 on the stage 12, to collect light rays reflected from the location A and the location B of each of the objects 11 into the optical lens within the microscope tube 14, by use of the trapezoidal prisms 19a and 19b, and the rectangular prisms 20a and 20b installed on each position. Then, the light rays are gathered to one image sensor 15, and images of the location A and the location B of each of the multiple objects to be measured 11 are simultaneously displayed on the display screen 18, in such a manner as being arranged side by side.

In the present embodiment, images on multiple locations being placed on the front-back both sides of the object to be measured 11 are displayed on one screen. It is further possible to place a parallel prism or a reflecting prism on the side of the object to be measured 11, the light ray reflected from the side surface is captured in the optical lens in the microscope tube 14, and the image of the side surface of the object to be measured 11 is displayed on the display screen 18 simultaneously, so that the alignment measurement is performed.

In addition, in the present embodiment, the trapezoidal prisms 19a and 19b are used, but a diamond prism or a rectangular prism may be employed. Alternatively, multiple prisms may be combined so that a light ray incident on one end is refracted by 90 degrees, made to pass through the optical guiding section, and further refracted by 90 degrees again, whereby the light ray is refracted in the direction opposite to that of the initial incident light ray, and then emitted from the other end.

As thus described, according to the embodiment of the present invention relating to the measuring apparatus and the measuring method, by use of one optical system, it is possible to measure on one screen multiple locations being spaced apart. According to the present invention relating to the measuring apparatus and the measuring method, it is possible to display multiple locations existing on the front-back both surfaces of the object to be measured, side by side on one screen, and by use of one optical system, measurement of a distance between multiple locations being spaced apart and existing on the front and the back surfaces can be performed. In addition, according to the present invention relating to the measuring apparatus and the measuring method, it is possible to measure accurately and easily the alignment and arrangement of parts of the object to be measured.

According to the present invention relating to the measuring apparatus and the measuring method, a parallel prism is used to refract the optical path by 90 degrees with respect to the height direction immediately above the object to be measured. Therefore, it is possible to reduce the size and height (work distance) of the optical system, thereby downsizing the measuring apparatus.

According to the present invention relating to the measuring apparatus and the measuring method, it is further possible to achieve a speedup in checking appearance of the object to be measured and inspecting any detect at multiple locations thereof, or at multiple locations on multiple objects to be measured.

Therefore, the measuring apparatus and the measuring method of the present invention can be applied to not only measurement of dimension of electronic device, but also a general structure which requires a highly precise measurement.

What are claimed are:

1. A measuring apparatus comprising,
a first prism, said first prism having a first light-reflecting surface, a second light-reflecting surface, and a first optical guiding section between said first light-reflecting surface and said second light-reflecting surface, said first light-reflecting surface reflecting a first light ray reflected from a first location on a surface of an object to be measured to said second light-reflecting surface via said first optical guiding section, said second light-reflecting surface reflecting said first light ray reflected by said first light-reflecting surface,
a second prism, said second prism having a third light-reflecting surface, a fourth light-reflecting surface, and a second optical guiding section between said third light-reflecting surface and said fourth light-reflecting surface, said third light-reflecting surface reflecting a second light ray reflected from a second location on said surface of said object to be measured to said fourth light-reflecting surface via said second optical guiding section, said fourth light-reflecting surface reflecting said second light ray reflected by said third light-reflecting surface,
an optical lens which converges or diverges said first light ray reflected by said second light-reflecting surface and said second light ray reflected by said fourth light-reflecting surface,
an image sensor which captures the light rays from said optical lens, and converts images of said first location and said second location into an electrical signal, and
a display unit which displays on one screen the images of said first location and said second location based on said electrical signal.

2. The measuring apparatus according to claim 1, wherein, said second light-reflecting surface and said fourth light-reflecting surface reflect in the same direction, said first and second light rays respectively reflected by said first light-reflecting surface and said third light-reflecting surface.

3. The measuring apparatus according to claim 2, wherein, said second light-reflecting surface and said fourth light-reflecting surface reflect in the same direction, said first and second light rays respectively reflected by said first light-reflecting surface and said third light-reflecting surface.

4. The measuring apparatus according to claim 1, wherein, said display unit rotates said images of said first location and said second location at the same angle.

5. A measuring apparatus comprising,
a first prism, said first prism having a first light-reflecting surface, a second light-reflecting surface, and a first optical guiding section between said first light-reflecting surface and said second light-reflecting surface, said first light-reflecting surface reflecting a first light ray reflected from a first location on a first object to be measured to said second light-reflecting surface via said first optical guiding section, said second light-reflecting surface reflecting said first light ray reflected by said first light-reflecting surface
a second prism, said second prism having a third light-reflecting surface, a fourth light-reflecting surface, and a second optical guiding section between said third light-reflecting surface and said fourth light-reflecting surface, said third light-reflecting surface reflecting a second light ray reflected from a second location on a second object to be measured to said fourth light-reflecting surface via said second optical guiding section, said fourth light-reflecting surface reflecting said second light ray reflected by said third light-reflecting surface,
an optical lens which converges or diverges said first light ray reflected by said second light-reflecting surface and said second light ray reflected by said fourth light-reflecting surface
an image sensor which captures the light rays from said optical lens, and converts images of said first location and said second location into an electrical signal, and
a display unit which displays on one screen the images of said first location and said second location based on said electrical signal.

6. A measuring apparatus comprising,
a first trapezoidal prism, said first trapezoidal prism having a first light-reflecting surface and a second light-reflecting surface, said first light-reflecting surface reflecting a first light ray reflected from a first location on a surface of an object to be measured to said second light-reflecting surface, said second light-reflecting surface reflecting said first light ray reflected by said first light-reflecting surface,
a second trapezoidal prism, said second trapezoidal prism having a third light-reflecting surface and a fourth light-reflecting surface, said third light-reflecting surface reflecting a second light ray reflected from a second location on the reverse side of said an object to be measured to said forth light-reflecting surface, said fourth light-reflecting surface reflecting said second light ray reflected by said third light-reflecting surface, a first reflecting prism and a second reflecting prism which capture said first and second light rays respectively reflected by said second and fourth light-reflecting surfaces, and respectively emit said first and second light rays in the same direction, an optical lens which converges or diverges said first and second light rays from said first reflecting prism and the second reflecting prism, an image sensor which captures the light rays from said optical lens, and converts images of said first location and said second location into an electrical signal, and a display unit which displays on one screen the images of said first location and said second location based on said electrical signal.

7. The measuring apparatus according to claim 6, wherein, said second light-reflecting surface and said fourth light-reflecting surface reflect said first light ray and said second light ray respectively in directions different by 180 degrees.

8. The measuring apparatus according to claim 7, wherein, said first reflecting prism and said second reflecting prism are rectangular prisms.

9. The measuring apparatus according to claim 6, wherein, said first reflecting prism and said second reflecting prism are rectangular prisms.

10. The measuring apparatus according to claim 6, wherein,
said display unit rotates said images of said first location and said second location at the same angle.

11. A measuring apparatus which converges or diverges a first light ray and a second light ray reflected respectively from a first location and a second location on one surface of an object to be measured, by use of an optical lens, displays images of said first location and said second location of said object to be measured on one screen via an image sensor, and measures on said one screen, a distance between multiple points positioned on said first location and said second location, or an angle or arrangement of parts of said object to be measured, the parts being positioned on said first location and said second location, wherein, said first light ray is reflected by a first light-reflecting surface of a first prism, said first light-reflecting surface being positioned just above said first location, said first prism having a second light-reflecting surface and a first optical guiding section between said first light-reflecting surface and said second light-reflecting surface, said first light-reflecting surface reflecting said first light ray reflected from said first location to said second light-reflecting surface via said first optical guiding section, said second light-reflecting surface reflecting said first light ray reflected by said first light-reflecting surface said second light ray is reflected by a third light-reflecting surface of a second prism, said third light-reflecting surface being positioned just above said second location, said third prism having a fourth light-reflecting surface and a second optical guiding section between said third light-reflecting surface and said fourth light-reflecting surface, said third light-reflecting surface reflecting said second light ray reflected from said second location to said fourth light-reflecting surface via said second optical guiding section, said fourth light-reflecting surface reflecting said second light ray reflected by said third light-reflecting surface, and said optical lens is placed at a position where said second light-reflecting surface and said fourth light-reflecting surface are arranged to be adjacent to each other.

12. The measuring apparatus according to claim 11, wherein,
said second light-reflecting surface and said fourth light-reflecting surface reflect in the same direction, said first and second light rays respectively reflected by said first light-reflecting surface and said third light-reflecting surface.

13. The measuring apparatus according to claim 11, wherein,
said images of said first location and said second location are rotated at the same angle before being displayed on said screen.

14. A measuring apparatus, which converges or diverges a first light ray and a second light ray reflected respectively from a first location on a first surface of the object to be measured and a second location on the reverse side of said first surface of said object to be measured, by use of an optical lens, displays images of said first location and said second location of said object to be measured on one screen via an image sensor, and measures on said one screen, a distance between multiple points positioned on said first location and said second location, angle and arrangement of parts on said object to be measured, the parts being positioned on said first location and said second location, wherein, in order to make said first light ray and said second light ray reflected from said first location and said second location at incident sides of a first and a second trapezoidal prism and said first light ray and said second light my at emitting side of said first and said second trapezoidal prism respectively to go along opposite directions, said first trapezoidal prism comprises a first light-reflecting surface at said incident side and a second light-reflecting surface at said emitting side, said second trapezoidal prism comprises a third light-reflecting surface at said incident side and a fourth light-reflecting surface at said emitting side, said first light-reflecting surface and said second light-reflecting surface are placed respectively just above said first location and said second location, multiple reflecting prisms are placed respectively at said second light-reflecting surface and said fourth light-reflecting surface, and the optical lens is placed at a position where said second light-reflecting surface and said fourth light-reflecting surface are arranged to be adjacent to each other.

15. The measuring apparatus according to claim 14, wherein, the multiple reflecting prisms are rectangular prisms.

16. The measuring apparatus according to claim 14, wherein,
one of said multiple reflecting prisms is a rectangular prism, and the other is a trapezoidal prism.

17. The measuring apparatus according to claim 14, wherein,
said images of said first location and said second location are rotated at the same angle before being displayed on said screen.

18. A measuring method comprising the steps of,
capturing light rays reflected from a first location and a second location on one surface of an object to be measured respectively into a first prism and a second prism, said first prism having a first light-reflecting surface, a second light-reflecting surface, and a first optical guiding section between said first light-reflecting surface and said second light-reflecting surface, said first light-reflecting surface reflecting a first light ray reflected from said first location to said second light-reflecting surface via said first optical guiding section, said second light-reflecting surface reflecting said first light ray reflected by said first light-reflecting surface, said second prism having a third light-reflecting surface, a fourth light-reflecting surface, and a second optical guiding section between said third light-reflecting surface and said fourth light-reflecting surface, said third light-reflecting surface reflecting a second light ray reflected from said second location to said fourth light-reflecting surface via said second optical guiding section, said fourth light-reflecting surface reflecting said second light ray reflected by said third light-reflecting surface, converging or diverging said first light ray reflected by said second light-reflecting surface and said second light ray reflected by said fourth light-reflecting surface, capturing the light rays thus converged or diverged and converting images of said first location and said second location on said object to be measured into an electrical signal, and displaying on one screen the images of said first location and said second location based on said electrical signal.

19. The measuring method according to claim 18, wherein, said second light-reflecting surface and said fourth light-reflecting surface reflect in the same direction, said first and said second light rays respectively reflected by said first light-reflecting surface and said third light-reflecting surface.

20. The measuring method according to claim 18, wherein, the images of said first location and said second location are rotated at the same angle before being displayed.

21. A measuring method comprising the steps of, capturing light rays reflected from a first location on a first object to be measured and a second location on a second object to be measured, respectively into a first prism and a second prism, said first prism having a first light-reflecting surface, a second light-reflecting surface, and a first optical guiding section between said first light-reflecting surface and said second light-reflecting surface, said first light-reflecting surface reflecting a first light ray reflected from said first location to said second light-reflecting surface via said first optical guiding section, said second light-reflecting surface reflecting said first light ray reflected by said first light-reflecting surface, said second prism having a third light-reflecting surface, a fourth light-reflecting surface, and a second optical guiding section between said third light-reflecting surface and said fourth light-reflecting surface, said third light-reflecting surface reflecting a second light ray reflected from said second location to said fourth light-reflecting surface via said second optical guiding section, said fourth light-reflecting surface reflecting said second light ray reflected by said third light-reflecting surface, converging or diverging said first light ray reflected by said second light-reflecting surface and said second light ray reflected by said fourth light-reflecting surface, capturing the light rays thus converged or diverged and convening images of said first location and said second location into an electrical signal, and displaying on one screen the images of said first location and said second location based on said electrical signal.

22. The measuring method according to claim 21, wherein, said second light-reflecting surface and said fourth light-reflecting surface reflect in the same direction, the light rays reflected respectively by said first light-reflecting surface and said third light-reflecting surface.

23. The measuring method according to claim 21, wherein, the images of said first location and said second location are rotated at the same angle before being displayed.

24. A measuring method comprising the steps of, capturing light rays reflected from a first location on a surface of an object to be measured and a second location on the reverse side of said surface of said object to be measured respectively into a first trapezoidal prism and a second trapezoidal prism, said first trapezoidal prism having a first light-reflecting surface and a second light-reflecting surface, said first light-reflecting surface reflecting a first light ray reflected from said first location to said second light-reflecting surface, said second light-reflecting surface reflecting said first light ray reflected by said first light-reflecting surface, said second trapezoidal prism having a third light-reflecting surface and a fourth light-reflecting surface, said third light-reflecting surface reflecting a second light ray reflected from said second location to said forth light-reflecting surface, said fourth light-reflecting surface reflecting said second light ray reflected by said fourth light-reflecting surface, capturing said first light ray and second light rays reflected by said second light-reflecting surface and said fourth light-reflecting surface respectively into said first reflecting prism and said second reflecting prism, and emitting each of the light rays in the same direction, converging or diverging the light rays from said first reflecting prism and said second reflecting prism, capturing the light rays thus converged and diverged, and convening images of said first location and said second location on said object to be measured into an electrical signal, and displaying on one screen the images of said first location and said second location based on said electrical signal.

25. The measuring method according to claim 24, wherein, said second light-reflecting surface and said fourth light-reflecting surface reflect said first light ray and said second light ray respectively in directions different by 180 degrees.

26. The measuring method according to claim 25, wherein, said first reflecting prism and said second reflecting prism are rectangular prisms.

27. The measuring method according to claim 24, wherein, said first reflecting prism and said second reflecting prisms are rectangular prisms.

28. The measuring method according to claim 24, wherein, the images of said first location and said second location are rotated at the same angle before being displayed.

* * * * *

UNITED STATES PATENT AND TRADEMARK OFFICE
CERTIFICATE OF CORRECTION

PATENT NO.         : 7,508,513 B2
APPLICATION NO.    : 11/400769
DATED              : March 24, 2009
INVENTOR(S)        : Masaru Inoue et al.

It is certified that error appears in the above-identified patent and that said Letters Patent is hereby corrected as shown below:

Column 19, line 2, delete the word "an"
Column 20, line 32, delete the word "my" and insert --ray--
Column 22, line 2, delete the word "convening" and insert --converting--
Column 22, line 33, delete the word "rays" and insert --ray--
Column 20, line 41, delete the word "convening" and insert --converting--

Signed and Sealed this

Eleventh Day of August, 2009

David J. Kappos
*Director of the United States Patent and Trademark Office*